(12) United States Patent
Hoffman et al.

(10) Patent No.: US 11,123,944 B1
(45) Date of Patent: Sep. 21, 2021

(54) PACKAGING ITEMS USING CUSTOMIZED 3D-PRINTED DUNNAGE

(71) Applicant: Amazon Technologies, Inc., Seattle, WA (US)

(72) Inventors: Brian Hoffman, Seattle, WA (US); Alexandra Hartford, Seattle, WA (US); Mohan Mahadevan, Seattle, WA (US); John Matrecano, Sammamish, WA (US); Timothy Talda, Renton, WA (US)

(73) Assignee: Amazon Technologies, Inc., Seattle, WA (US)

(*) Notice: Subject to any disclaimer, the term of this patent is extended or adjusted under 35 U.S.C. 154(b) by 185 days.

(21) Appl. No.: 16/214,605

(22) Filed: Dec. 10, 2018

(51) Int. Cl.
*B65B 55/20* (2006.01)
*B65B 33/00* (2006.01)
(Continued)

(52) U.S. Cl.
CPC .............. *B31D 5/0069* (2013.01); *B65B 5/02* (2013.01); *B65B 5/10* (2013.01); *B65B 33/00* (2013.01); *B65B 55/20* (2013.01); *B65B 57/10* (2013.01); *B65D 81/113* (2013.01); *B29C 64/106* (2017.08); *B29C 64/209* (2017.08); *B29C 64/393* (2017.08); *B31D 2205/0082* (2013.01); *B31D 2205/0088* (2013.01); *B33Y 10/00* (2014.12); *B33Y 30/00* (2014.12); *B33Y 50/02* (2014.12); *B65B 2210/04* (2013.01); *B65B 2220/16* (2013.01)

(58) Field of Classification Search
CPC ........... B65B 5/02; B65B 23/00; B65B 33/00; B65B 33/02; B65B 33/04; B65B 55/20; B65B 2210/04; B65B 2220/16; B65D 81/113; B31D 5/0039; B31D 5/0069; B05C 5/0208
USPC ................... 53/428, 472, 111 R, 139.5, 140; 206/521, 523, 524
See application file for complete search history.

(56) References Cited

U.S. PATENT DOCUMENTS 3,131,240 A * 4/1964 Kirkpatrick .......... B65D 85/307
264/230
3,360,900 A * 1/1968 Nugarus ................. B65B 33/02
53/140
(Continued)

FOREIGN PATENT DOCUMENTS

DE         10218347 A1 * 11/2003 ............. B65B 33/02

*Primary Examiner* — Stephen F. Gerrity
(74) *Attorney, Agent, or Firm* — Athorus, PLLC

(57) ABSTRACT

Dunnage may be applied to surfaces of items by nozzles coupled to one or more robotic arms that may be operated in six degrees of freedom within three-dimensional space. The dunnage is applied in substantially hollow pieces or sections by one or more 3D printing processes, e.g., by deposition. Such pieces or sections may be applied in one or more series or patterns along surfaces of an item prior to enveloping the item in one or more wraps or covers, or depositing the item in one or more containers. Various characteristics of the dunnage, such as materials from which the dunnage is formed, diameters or thicknesses of the dunnage, the series or patterns in which the dunnage is applied to the surface of the item, or any other factors may be selected based on one or more attributes of the items, such as dimensions or shipping and handling instructions.

21 Claims, 27 Drawing Sheets

(51) Int. Cl.
*B65B 57/10* (2006.01)
*B31D 5/00* (2017.01)
*B65B 5/10* (2006.01)
*B65D 81/113* (2006.01)
*B65B 5/02* (2006.01)
*B33Y 30/00* (2015.01)
*B33Y 10/00* (2015.01)
*B29C 64/393* (2017.01)
*B33Y 50/02* (2015.01)
*B29C 64/209* (2017.01)
*B29C 64/106* (2017.01)

(56) References Cited

U.S. PATENT DOCUMENTS

| | | | | |
|---|---|---|---|---|
| 3,383,054 A | * | 5/1968 | Nugarus | B65B 33/00 239/597 |
| 3,666,850 A | * | 5/1972 | Windecker | B65B 55/20 264/45.4 |
| 4,043,096 A | * | 8/1977 | Wallis | B65B 33/00 53/427 |
| 5,139,153 A | * | 8/1992 | Delamare et al. | B65D 81/05 206/521 |
| 9,339,974 B2 | * | 5/2016 | Spalt | B29C 64/393 |
| 9,840,347 B1 | * | 12/2017 | Linnell et al. | B65B 55/20 |
| 2006/0156978 A1 | * | 7/2006 | Lipson et al. | B29C 64/106 118/708 |
| 2015/0096266 A1 | * | 4/2015 | Divine et al. | B33Y 10/00 53/452 |
| 2015/0145158 A1 | * | 5/2015 | Levine et al. | B29C 64/393 264/40.1 |
| 2016/0136887 A1 | * | 5/2016 | Guillemette et al. | B29C 64/106 428/375 |
| 2016/0346997 A1 | * | 12/2016 | Lewis et al. | B29C 64/106 |
| 2017/0253401 A1 | * | 9/2017 | Bouthillier | B65B 55/20 |
| 2018/0141685 A1 | * | 5/2018 | Colson et al. | B33Y 30/00 |
| 2019/0118258 A1 | * | 4/2019 | Sachs et al. | B29C 64/393 |
| 2019/0354083 A1 | * | 11/2019 | Teng et al. | B29C 64/106 428/375 |

* cited by examiner

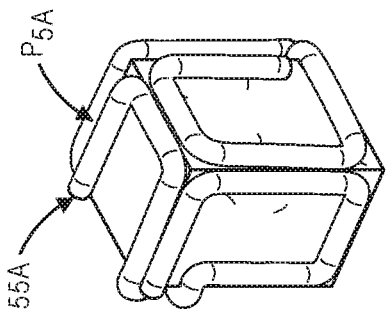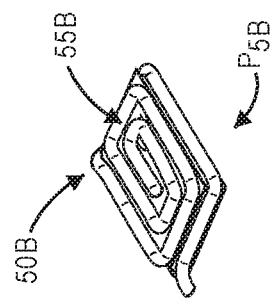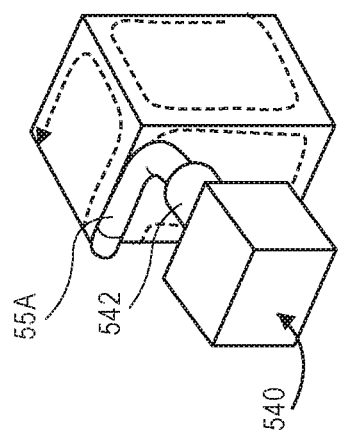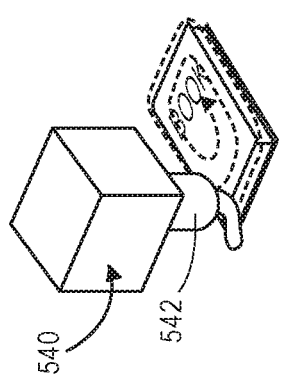
FIG. 5A
FIG. 5B
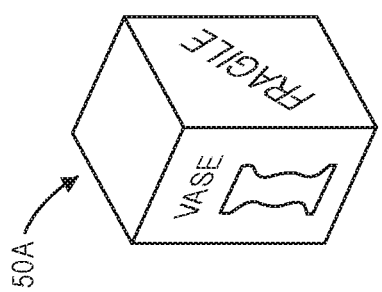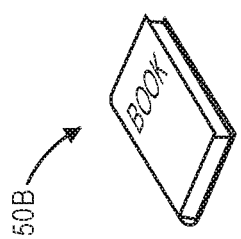

PACKAGING ITEMS USING CUSTOMIZED 3D-PRINTED DUNNAGE

BACKGROUND

Contemporary online marketplaces are able to offer a wide variety of groups or types of items (including goods, services, information and/or media of any type or form) to customers who may be located in virtually any area of the globe, in any number of ways. Such items may be delivered to a fulfillment center or other facility operated by the online marketplace by one or more sellers, vendors, manufacturers or other sources. When a customer places an order for one or more of the items, the online marketplace may package the item for delivery to the customer, process any necessary transactions, and arrange for the items to be delivered to the customer.

Within a modern fulfillment center environment, items that have been ordered by customers are typically delivered to the customers, or to destinations specified by such customers, according to one or more general methods. For example, an ordered item may be retrieved from a designated storage location and transported to a workstation where the item is to be prepared for delivery. Upon an arrival of the ordered item at the workstation, the item may be recognized by one or more manual or automatic means, such as by scanning or reading an external marking, label or other identifier on an outer surface of the item, by recognizing a data transfer device associated with the item or the vehicle in which it is transported, or by determining a mass of the item.

Once an ordered item has been identified, a set of instructions for preparing the ordered item for delivery may be determined and provided to a worker, e.g., on paper, or on at least one monitor or other computer display, and such instructions may be of any kind or take any form. For example, the instructions may identify a container (e.g., a box, a bag, a tube, an envelope) into which the ordered item is to be placed, along with an amount and type of dunnage (e.g., paper, plastic, foam materials or "bubble wrap"), a means of transit by which the container is to be delivered (e.g., a common carrier, the United States Postal Service, or a customized or specialized means of transit), as well as a destination for the container. Additionally, the instructions may be intrinsic to the ordered item itself. For example, an instruction may direct a worker to affix a label or decal on heavy or large items, to include a gift card or order description (e.g., packing slip) in a container with the ordered item, or to take any other specific action based on one or more attributes of the ordered item.

The processes of selecting containers and dunnage may be substantial drivers of the costs or time required in order to deliver such items. For example, while containers such as boxes, bags, tubes or envelopes are typically manufactured in nominal sizes, an item having dimensions that deviate from dimensions of nominally sized containers may require packing within a container having a number of voids or unused spaces, which are typically filled with dunnage. Moreover, selecting proper amounts and types of dunnage may create dilemmas for workers who are packing items within containers, as selecting excessive amounts of dunnage or overly heavy dunnage increases the weight of a container and may lead to unnecessary increases in cost, while selecting insufficient amounts of dunnage or inadequate types of dunnage may increase a risk of damage to an item during delivery. Furthermore, even when an item arrives at a destination safely, a customer or other recipient must dispose of a container in which the item arrived, along with any associated dunnage upon its arrival.

BRIEF DESCRIPTION OF THE DRAWINGS

FIGS. 5A through 5D are views of aspects of processes for preparing customized dunnage in accordance with embodiments of the present disclosure.

DETAILED DESCRIPTION

As is set forth in greater detail below, the present disclosure is directed to preparing customized dunnage for items using automated fabricators, or "3D printers," that may be operated with six degrees of freedom in three-dimensional space. In some embodiments, one or more attributes of an item, such as intrinsic attributes such as dimensions, masses, shapes or contents of the items, or extrinsic attributes such as shipping or handling restrictions or other attributes, may be identified or determined using one or more sensors, such as cameras. Based on such attributes, characteristics of dunnage to be applied to external surfaces of the item, including materials from which the dunnage is to be formed, dimensions of the dunnage, and patterns or densities in which the dunnage is to be applied to surfaces of the item. Using the characteristics of the dunnage and the attributes of the item, an automated fabricator disposed at an end effector or other automated system may be programmed with one or more sets of instructions for applying the dunnage on such surfaces. An item may be manipulated or handled using one or more conveying systems, robotic arms or other instruments, or other features as the dunnage is being applied thereon.

Additionally, dunnage may be applied to surfaces of items using any number of automated fabricators, each of which may be disposed at end effectors or other automated systems and configured with one or more nozzles for applying dunnage. Furthermore, end effectors or nozzles may be constructed or configured to apply dunnage formed from any raw materials to surfaces of items at any angles and in any geometries or shapes. In some embodiments, dunnage may be applied to surfaces of items in a desired geometry shape. For example, where an item has a non-standard geometry or shape (e.g., an item having one or more non-planar or irregularly shaped surfaces), the dunnage may be applied to surfaces of the item in layers that cause the item to have a standard geometry or shape (e.g., with one or more planar or regularly shaped surfaces).

After dunnage has been applied to an item, the item may be enveloped in plastic wrappings or other coverings, or deposited in an appropriately sized container, and transported to a selected destination.

Figure 1A:
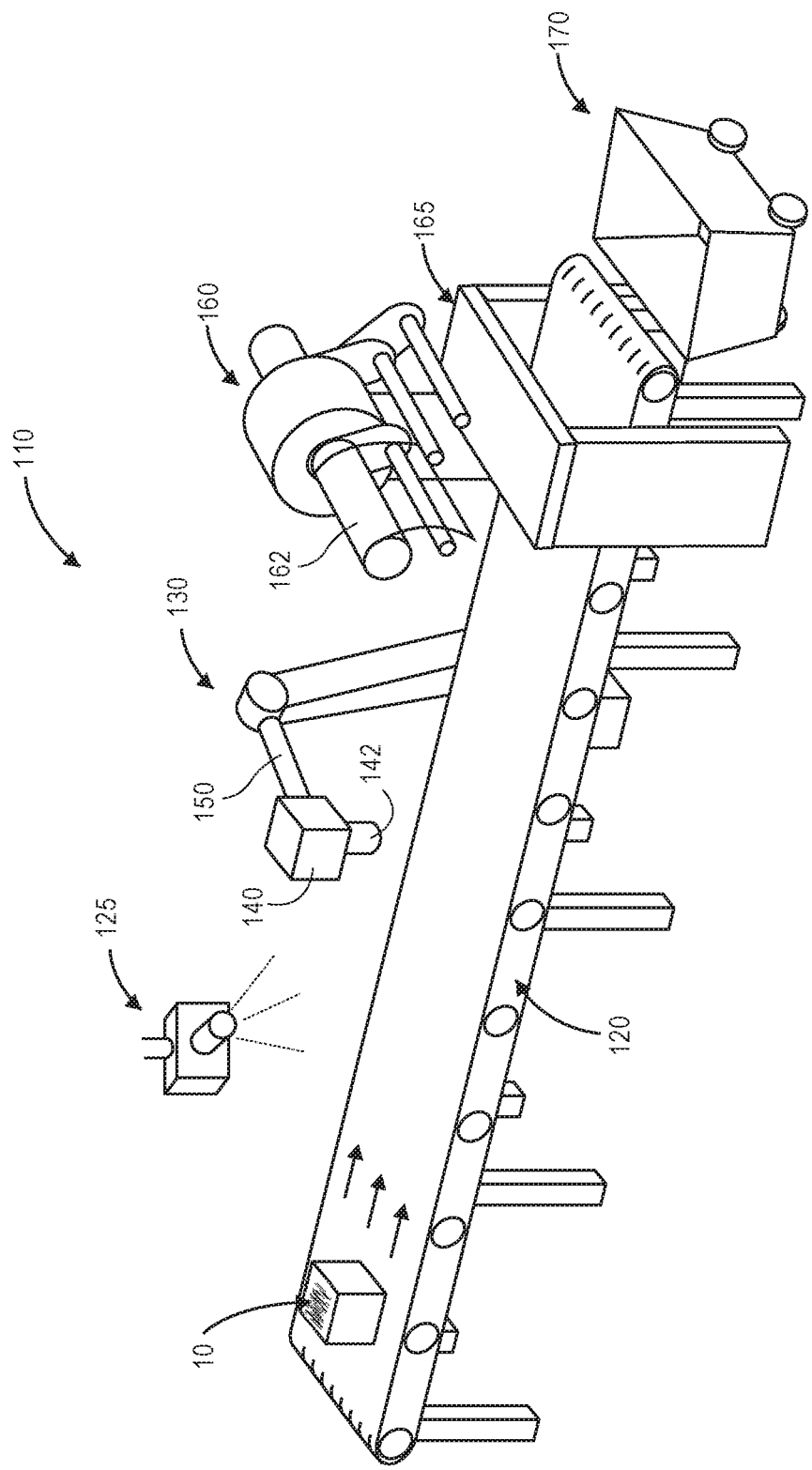
FIGS. 1A through 1F are views of aspects of one system for preparing customized dunnage in accordance with embodiments of the present disclosure.

Referring to FIGS. 1A through 1F, views of aspects of one system 110 for preparing customized dunnage in accordance with embodiments of the present disclosure are shown. As is shown in FIG. 1A, the system 110 includes a materials handling system 120, an imaging device 125, a dunnage applicator 130, a wrapping system 160 and a bin 170.

As is shown in FIG. 1A, the materials handling system 120 may be any type or form of conveyor or powered carrier for transporting items, viz., an item 10, on one or more components (e.g., belts, chains, hooks, rails, rollers, tracks) within a field of view of the imaging device 125, and within a vicinity of one or more of the dunnage applicator 130 or the wrapping system 160, before depositing the items into the bin 170 or one or more other systems. The imaging device 125 may be a visual camera, a depth camera or any other sensor configured to capture imaging data regarding items being transported by the materials handling system 120, within a field of view of the imaging device 125. Alternatively, or additionally, the system 110 may include two or more imaging devices 125, as well as any number of sensors other than imaging devices. Alternatively, or additionally, the materials handling system 120 may include any number of other systems, including but not limited to robotic arms, diverters or other systems, and need not include or be limited to conveyors or conveying systems.

The dunnage applicator 130 includes an end effector 140 and a robotic arm 150. The end effector 140 includes an automated fabricator nozzle (e.g., a deposition nozzle) 142 and may be programmed or configured to operate in response to computer-based instructions and apply one or more raw materials (e.g., plastics or plastic-like substances) in liquid or semi-liquid states on one or more surfaces of the item 10. The robotic arm 150 may be any system that is configured to reposition the end effector 140 along one or more principal axes (e.g., vertically, laterally or longitudinally with respect to a direction of travel of the materials handling system 120), or to rotate about one or more of the principal axes, e.g., by one or more servo motors, hydraulic systems, pneumatic systems, or other systems. Accordingly, the dunnage applicator 130 may be programmed to reposition or rotate the end effector 140 and the automated fabricator nozzle 142 by the robotic arm 150, and to initiate or secure flow of the raw materials through the automated fabricator nozzle 142, upon one or more surfaces of items, viz., the item 10. In some embodiments, the flow of the raw materials through the automated fabricator nozzle 142 results in the generation of dunnage in the form of one or more linear sections or pieces that, when allowed to harden below a predetermined or selected temperature, create a physical barrier for the item 10 that may withstand one or more impacts, shocks or other adverse physical effects. In some embodiments, the raw materials may include an acrylonitrile butadiene styrene (or "ABS"), an acrylonitrile styrene acrylate (or "ASA"), a polyimide (e.g., nylon), a polylactic acid (or "PLA"), a polyethylene terephthalate (or "PET"), such as a glycol-modified polyethylene terephthalate (or "PETG"), a polypropylene, or a thermoplastic polyurethane (or "TPU"), or other compatible thermoplastic materials. In some other embodiments, the raw materials may include any other plastics, liquids, gases, metals or other substances that may be applied by the end effector 140, by way of the automated fabricator nozzle 142. Alternatively, or additionally, the system 110 may include two or more dunnage applicators 130, each having end effectors 140 including automated fabricator nozzles 142 deposited at ends of robotic arms 150.

The wrapping system 160 is any system for applying one or more layers 162 of plastics (e.g., thermoplastic films, such as "shrink wrap") to an item, viz., the item 10, either after one or more layers of dunnage are applied thereto by the dunnage applicator 130 or, alternatively, without any dunnage applied to the item 10. The layers 162 may be stored on one or more spools and manually or automatically applied to surfaces of the item 10 before being heated, folded, formed, wrapped or molded around the item 10 within a tunnel 165, which may include one or more conductive, convective or radiant sources of heat for heating the layers 162, e.g., an oven, or alternatively, one or more rollers, heads or other components. Alternatively, or additionally, the system 110 may further include one or more stations or systems for inserting the item 10 and/or any dunnage applied thereon into one or more containers such as boxes, envelopes, tubes or bags.

The bin 170 may be any fixed or mobile system for receiving items, e.g., the item 10, after dunnage and/or one or more layers 162 have been applied thereto. Alternatively, items may be received by one or more human workers, autonomous mobile robots, or any other systems.

Figure 1B:
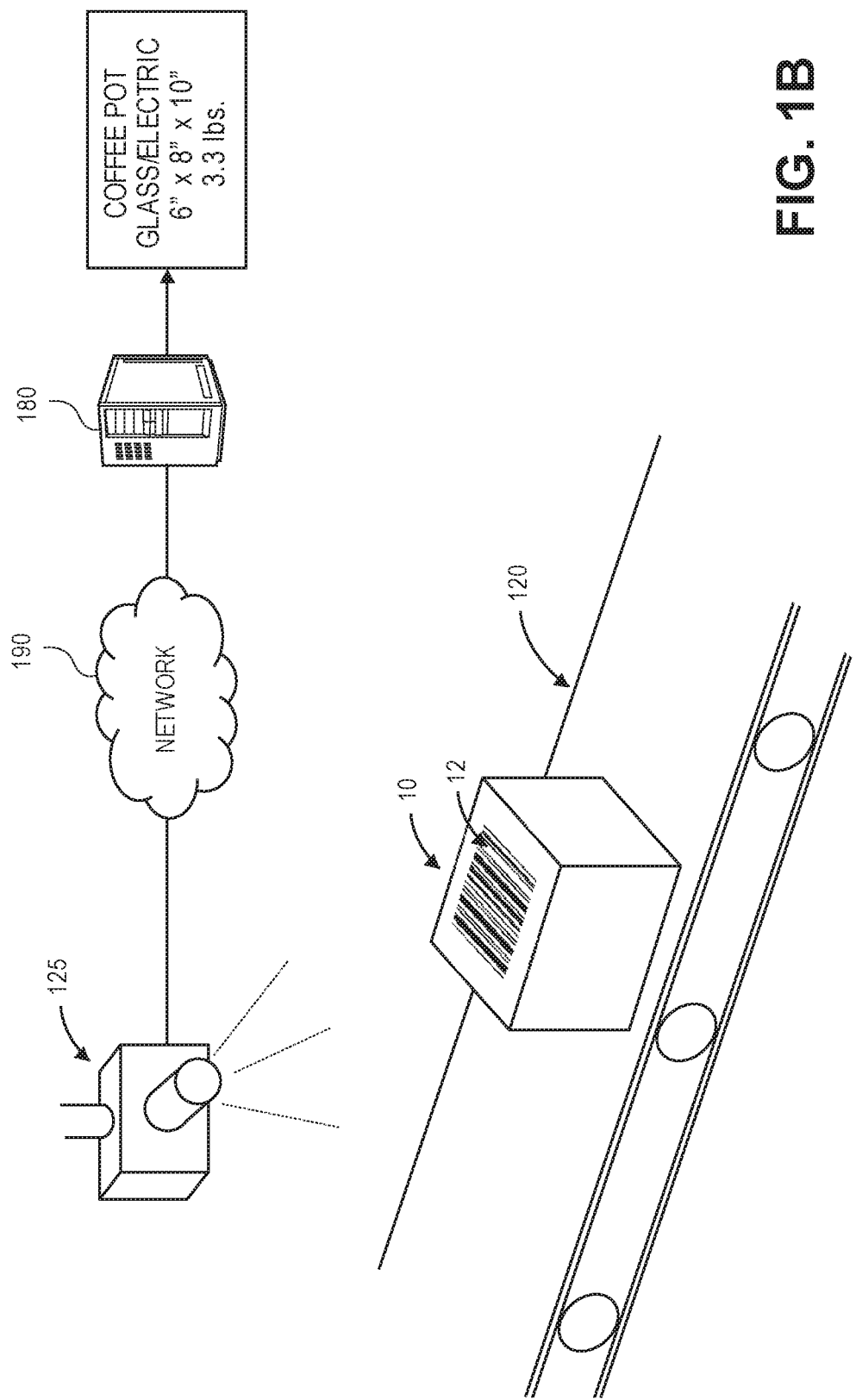

As is shown in FIG. 1B, when the item 10 passes within the field of view or operating range of the imaging device 125 (or other sensor), data is captured and processed by a server 180 or other computing device associated with the system 110, e.g., over one or more networks 190, which may include the Internet in whole or in part. For example, the imaging device 125 may capture imaging data depicting the item 10 and/or one or more bar codes 12, symbols, characters or other markings thereon, and process the imaging data to determine one or more attributes of the item. In some embodiments, the server 180 may determine attributes such as dimensions, shapes or sizes of the item 10 based on the imaging data, which may include visual imaging data or depth imaging data. In some other embodiments, the server 180 may identify the item 10 based on the imaging data, e.g., by recognizing an outline or other aspect of the item 10 within the imaging data or by interpreting the bar code 12, and identify information or data regarding attributes of the item 10 maintained in one or more data stores accordingly. In still other embodiments, attributes of the item 10 may be determined based on the imaging data, and also upon identifying the item 10.

Figure 1C:
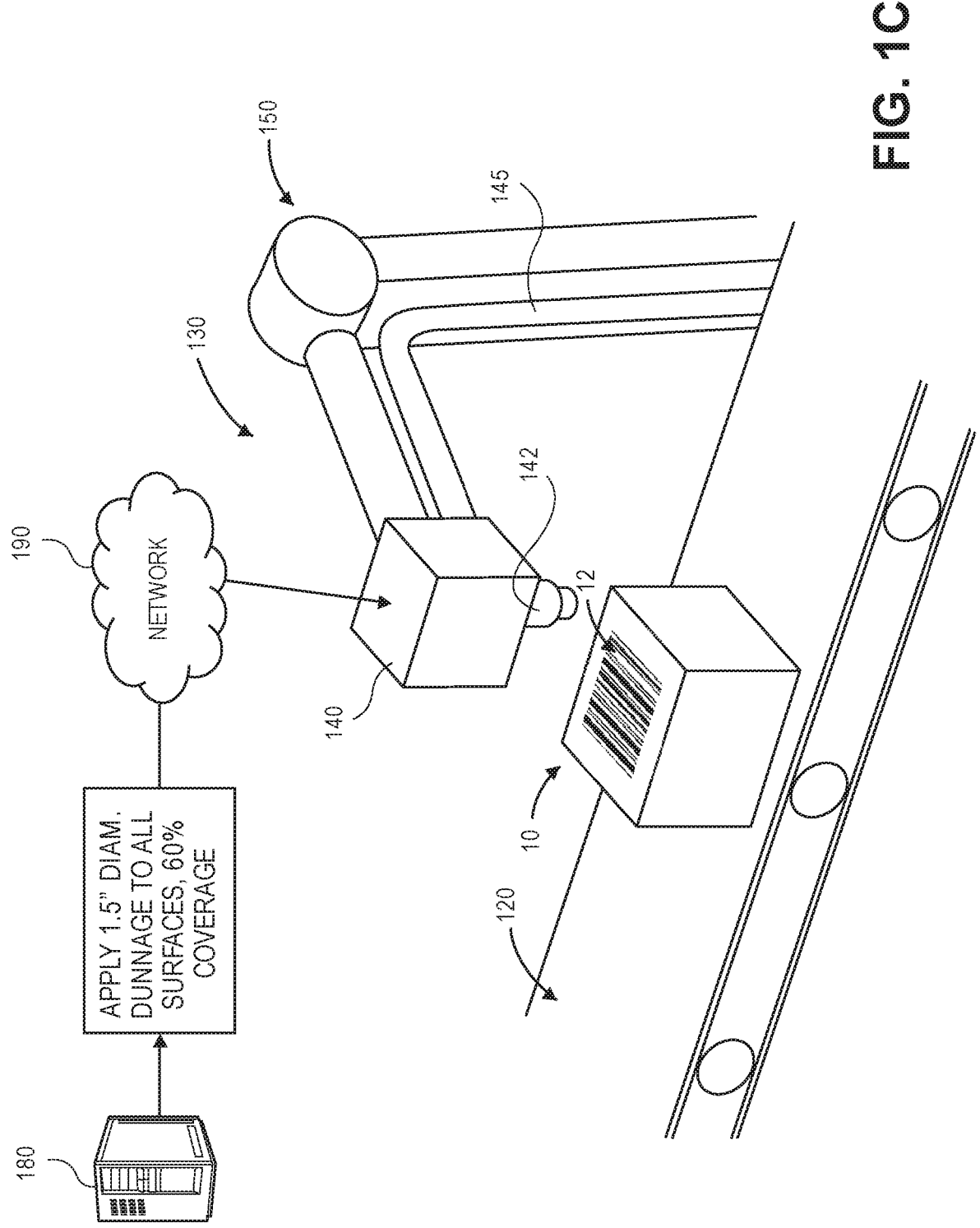

As is shown in FIG. 1C, upon determining the attributes of the item 10, the server 180 provides one or more sets of instructions to the dunnage applicator 130 over the network 190. The instructions may call for repositioning or rotating the end effector 140 and the automated fabricator nozzle 142 along or about one or more of the principal axes, e.g., by raising or lowering the end effector 140 or the automated fabricator nozzle 142 along a vertical axis, by moving the end effector 140 or the automated fabricator nozzle 142 laterally, forward or backward along a lateral or longitudinal axis using the robotic arm 150 in a manner consistent with a desired pattern of dunnage on the one or more surfaces of the item 10. Because the dunnage applicator 130, which includes a supply line 145 connected to a source of raw materials (not shown), may manipulate the end effector 140 with respect to six degrees of freedom in three-dimensional space, e.g., by translating the end effector 140 along one or more principal axes, or by rotating the end effector 140 about the one or more principal axes, the dunnage applicator 130 is able to apply dunnage of any thickness in various patterns on any sides or surfaces of items 10, and in any extent or at any density. For example, in some embodiments, the patterns, thicknesses and/or densities of dunnage to be applied to the item 10 may be selected with respect to surface features of the item 10, e.g., planar or non-planar surfaces of the item 10. Alternatively, the patterns, thicknesses and/or densities of dunnage to be applied to the item 10 may be selected in order to result in an object having a desired geometry or shape. For example, where the item 10 has a non-standard geometry or shape (e.g., a round geometry or shape, or a geometry or shape having one or more surfaces of irregular or erratic sizes), the patterns, thicknesses and/or densities of dunnage to be applied to the item 10 may be selected to form an object having a standard geometry or shape, such as a geometry or shape with one or more flat or regularly shaped surfaces, including but not limited to a geometry or shape that may be readily deposited into a selected container or storage area.

Figure 1D:
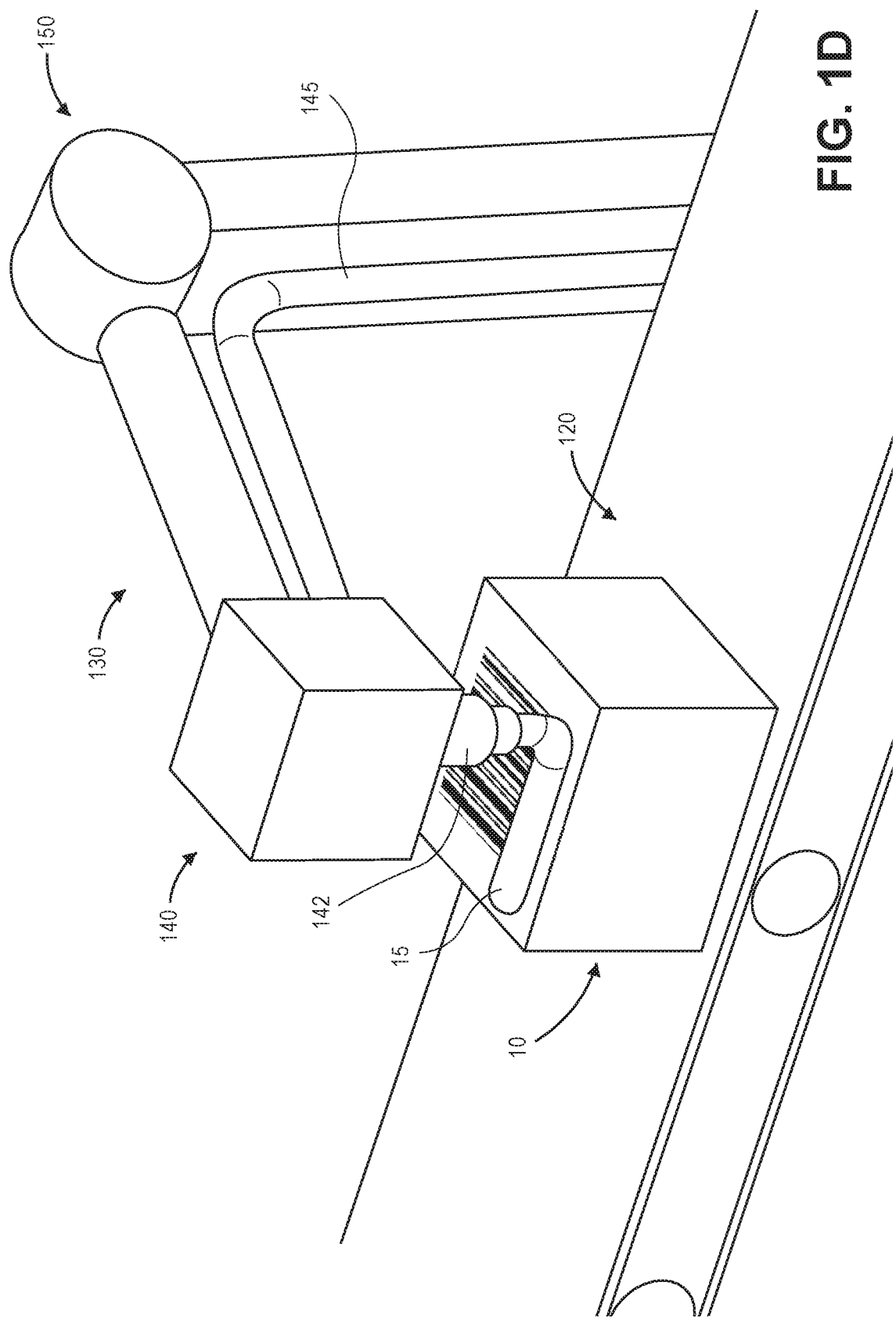

As is shown in FIG. 1D, the dunnage applicator 130 applies a line or section of dunnage 15 along one of the surfaces of the item 10. The dunnage applicator 130 causes raw materials received from the line 145 to be expelled by the automated fabricator nozzle 142 upon the surfaces of the item 10, in a liquid or semi-liquid state, e.g., according to an extrusion process, as the automated fabricator nozzle 142 travels along and within sufficiently short ranges of surfaces of the item 10, in paths corresponding to a desired pattern of dunnage on the surfaces of the item 10. In some embodiments, the nozzle 142 may apply dunnage at any angles and in lines or sections having various sizes or shapes, e.g., thicknesses or cross-sectional areas in the form of circles or cylinders or, alternatively, triangles, rectangles or any other shapes having flat or curvilinear surfaces. Alternatively, the dunnage 15 may be applied while the item 10 is stationary or in motion, and using two or more dunnage applicators 130 (only one of which is shown). The dunnage 15 is formed by a hardening of the raw materials, e.g., as the raw materials cool and/or solidify on the surfaces of the item 10. In some embodiments, the dunnage 15 may be peeled, broken, snapped or otherwise removed from the surfaces of the item 10 at a later time, e.g., when the item 10 has arrived at an ultimate destination.

Figure 1E:
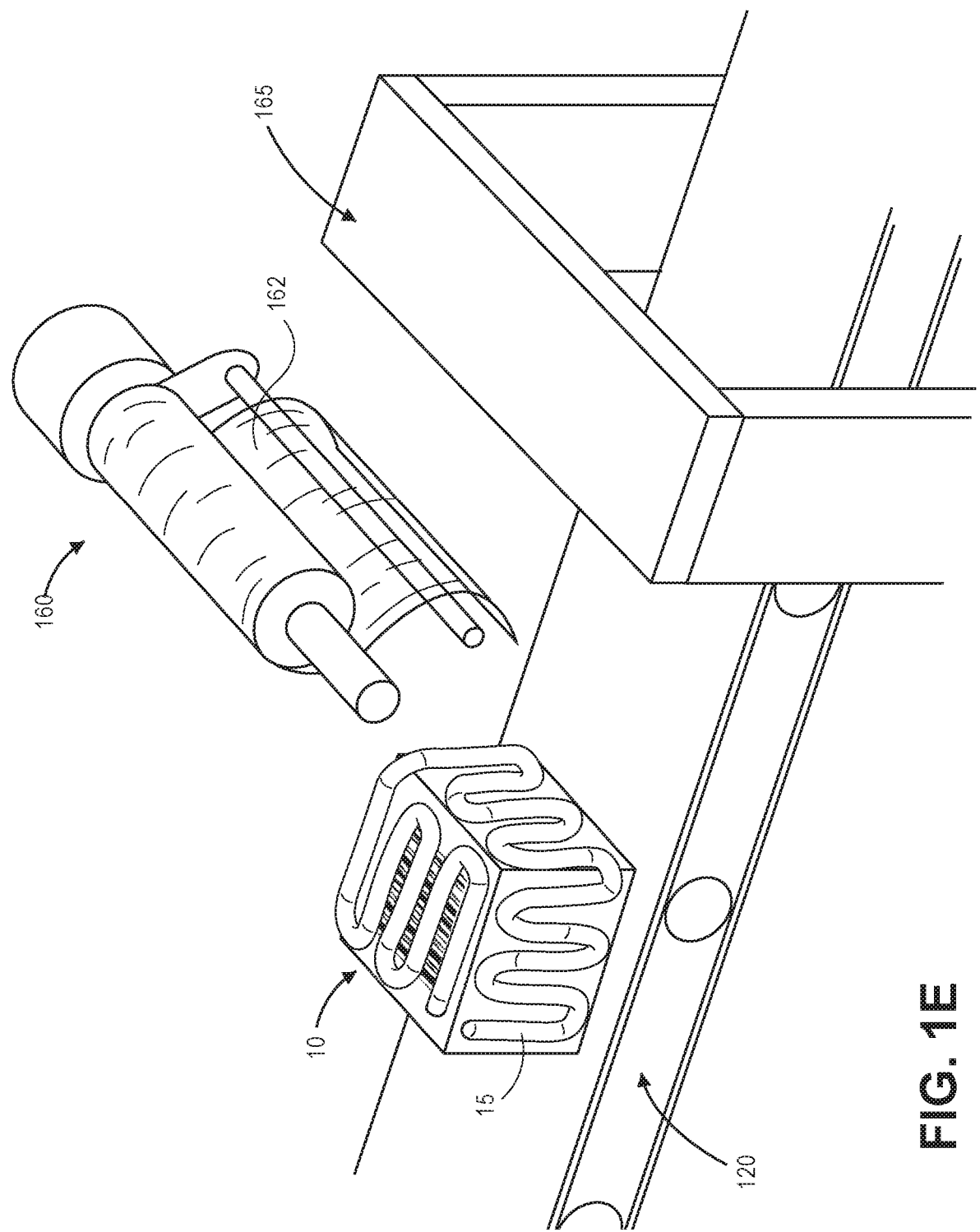

As is shown in FIG. 1E, after the dunnage applicator 130 has applied the dunnage 15 in one or more lines or sections on surfaces of the item 10, e.g., in the form of a desired pattern, the item 10 may be prepared for delivery to one or more locations with the dunnage 15 thereon by transporting the item 10 on the materials handling system 120 to the wrapping system 160, where the item 10 is enveloped in the one or more layers 162 of plastics, which are heated, folded, formed, wrapped or molded around the item 10 with the dunnage 15 thereon within the tunnel 165. In some embodiments, the item 10 and the layers 162 may be subjected to heat from one or more conductive, convective or radiative sources to cause the layers 162 to contract (e.g., shrink) around the item 10 and the dunnage 15. Alternatively, in some embodiments, the item 10 and the dunnage 15 may be deposited into one or more containers.

Figure 1F:
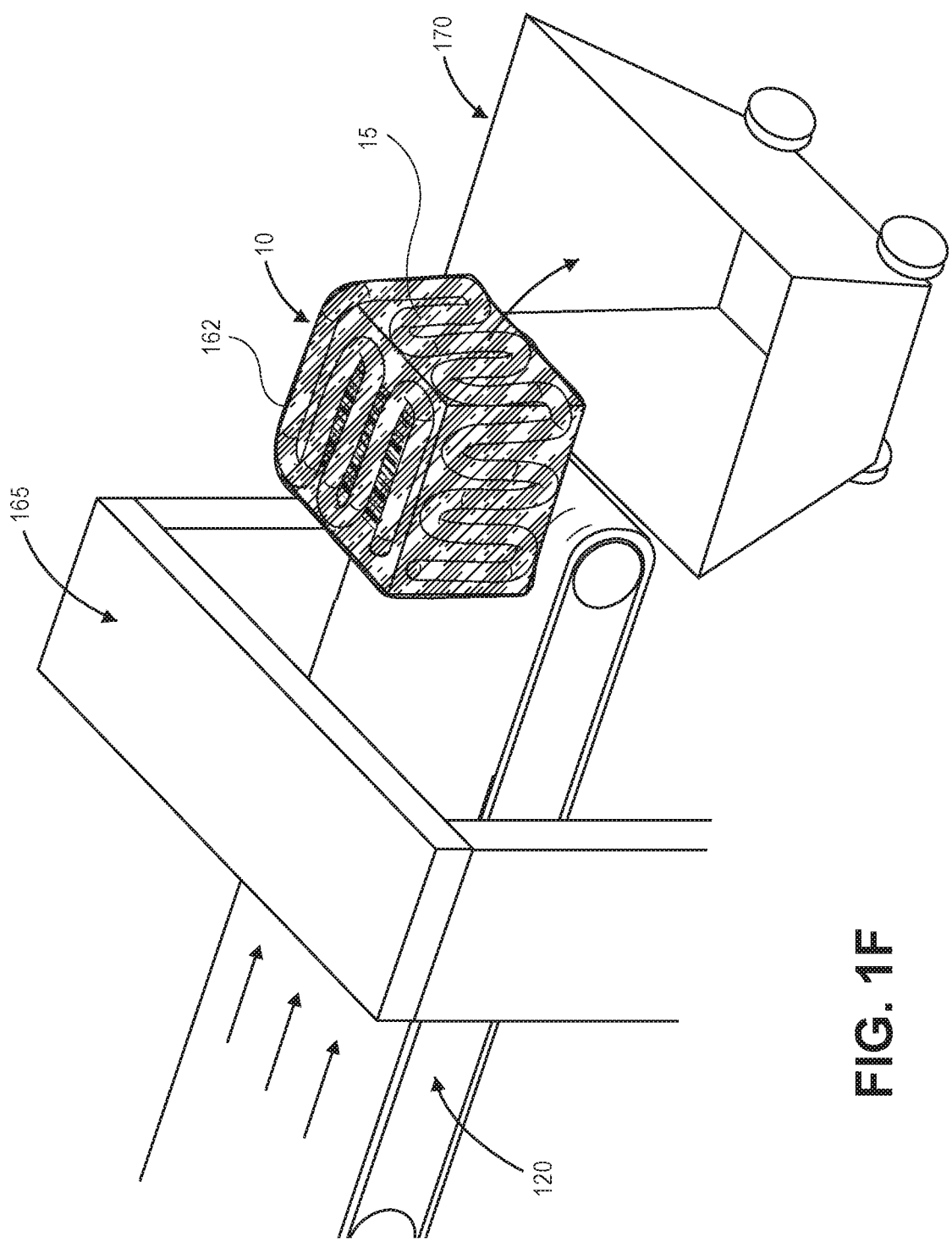

As is shown in FIG. 1F, after the item 10 and the dunnage 15 have been wrapped in the layers 162 by the wrapping system 160, the materials handling system 120 delivers the item 10 into the bin 170, which may be used to transport the item 10 to one or more stations for delivery to a desired location, such as a destination specified in an order, or any other locations.

Additive manufacturing, which is sometimes referred to by the name "3D printing," has evolved as a computer-based means for generating three-dimensional objects from digital designs. Automated fabricators, or "3D printers," typically function as miniature robotic factories and are not limited to "printing" applications. Currently, most automated fabricators operate by interpreting computer-based instructions to stack or form one or more raw materials into layers, and constructing an end product layer-by-layer based on such instructions, rather than by machining the end product from something larger (e.g., "subtractive" manufacturing), or by forming the end product exclusively from an injection mold. For example, an automated fabricator that is programmed with design instructions (e.g., a computer-aided drafting file) for producing a plastic part or component may form liquid, molten or powder-based materials into one or more layers or patterns on surfaces of materials.

Some procedures for forming objects in a layer-by-layer manner using automated fabricators, such as 3D printers, include "selective binding," in which an object is formed from powders and binding agents or heat, "selective solidification," in which layers of liquid are solidified one after another, or "selective deposition," in which materials are melted and applied in specific locations, as necessary, before being allowed to cure or solidify. Additionally, objects may be formed by hybrid techniques that incorporate two or more of such procedures. Such procedures or techniques may be repeated, as necessary, until a complete three-dimensional object is formed as desired.

Some conventional automated fabricators or 3D printers display independent and perpendicular movements in directions of principal or orthogonal axes, e.g., vertical, lateral and longitudinal axes (or x-, y- and z-axes). In such fabricators, a nozzle is typically always pointed in a downward orientation as a head or other system to which the nozzle is coupled is moved in linear directions along the principal axes. Such arrangements enable the construction of articles or features having bases or foundations of constant sizes, or bases or foundations having dimensions that are not smaller than portions of such articles or features at elevations above such bases or foundations. Such arrangements are unable, however, to construct articles or features having irregular or eccentric heights or profiles at elevations above such bases or foundations. Moreover, the inability to rotate a head or a nozzle about one or more axes further complicates the processes by which such articles or features are constructed, or otherwise limits the geometries or configurations of the articles or features that may be constructed thereby.

The systems and methods of the present disclosure are directed to the application of dunnage to surfaces of items using one or more automated fabricator systems that may be operated in six degrees of freedom within three-dimensional space, e.g., by translation in directions selected with respect to one, two or three principal or orthogonal axes, or by rotation about axes defined with respect to one, two or three principal or orthogonal axes.

In some embodiments, one or more attributes of an item, e.g., dimensions, masses, shapes or contents of the item, or other attributes, as well as shipping or handling restrictions on the item, may be determined based on information or data captured by one or more sensors. Based on such attributes or restrictions, one or more characteristics of dunnage that is to be applied to external surfaces of the item may be selected. Such characteristics may include, but are not limited to, raw materials from which the dunnage is to be formed, dimensions of the dunnage, or patterns or densities in which the dunnage is to be applied to surfaces of the item. Using the characteristics of the dunnage and the attributes or restrictions, a dunnage applicator having an automated fabricator disposed at an end effector or other automated system may be programmed with one or more sets of instructions for applying the dunnage on such surfaces, e.g., by manipulating the end effector and automated fabricator in six degrees of freedom within three-dimensional space, in a manner consistent with the selected patterns or densities. After dunnage has been applied to an item, the item may be enveloped in plastic wrappings or other coverings, or deposited in appropriately sized containers, and transported to a selected destination.

Attributes of items may be determined based on any type or form of information or data that may be captured using one or more sensors. For example, in some embodiments, a packaging system may evaluate items using one or more sensors, e.g., imaging devices (such as visual cameras or depth cameras), acoustic sensors, scales or other weight sensors, scanners, readers (such as radiofrequency identification readers, or RFID readers), ultrasonic sensors, haptic sensors, or any other sensors, which may be provided individually or in groups or arrays of two or more sensors. Information or data captured by one or more of such sensors may be used to determine one or more attributes of the item (e.g., dimensions, masses, shapes or contents of the item), or any other information regarding the item (e.g., shipping or handling restrictions), such as based on an analysis of the information or data, or by identifying the item from the information or data. In some embodiments, upon identifying an item, one or more attributes of the item or shipping or handling restrictions on the item may be identified in records or files maintained in one or more data stores and used to select characteristics of dunnage to be applied to the item, and to program a packaging system accordingly. The characteristics of the dunnage may be selected with respect to dimensions of the item in any manner, and provided to a packaging system, e.g., by wired or wireless means, in order to program or control one or more aspects of the packaging system to apply dunnage having the selected characteristics accordingly.

In some embodiments, dunnage may be applied to surfaces of items in the form of hollow tubes or tube-like structures formed from raw materials in a liquid or semi-liquid state that are permitted to harden or solidify. Such raw materials may preferably include, but are not limited to, polylactic acids, polyethylene terephthalates, glycol-modified polyethylene terephthalates, or thermoplastic polyurethanes, or any other plastics, liquids, gases, metals or other substances that may be applied by automated fabricators.

In some embodiments, an automated fabricator disposed at an end effector of a dunnage applicator system or robotic arm may include a single-piece nozzle (e.g., a deposition nozzle) that forms tubes or tube-like structures of dunnage by extrusion processes. For example, a single-piece nozzle may include a plug or centerbody that is disposed within a flow path, e.g., by mounting the plug or centerbody to one side of the flow path. Such nozzles may be used to deposit or otherwise apply tube-like structures of dunnage (e.g., lines or sections of dunnage) by flow of raw materials therethrough in the form of incomplete cylinders, or cylinders having breaks along longitudinal axes thereof. In some embodiments, an automated fabricator disposed at an end effector of a dunnage applicator system or robotic arm may include a multi-piece nozzle that forms tubes or tube-like structures of dunnage by extrusion processes. For example, a two-piece nozzle may include a plug or centerbody that is disposed within a flow path, e.g., by mounting the plug or centerbody to internal surfaces of an inlet of the nozzle, or upstream of an outlet of the nozzle. Such nozzles may be used to deposit or otherwise apply tube-like structures of dunnage by flow of raw materials therethrough in the form of complete cylinders, or cylinders without breaks along longitudinal axes thereof. Alternatively, the dunnage may be applied in lines or sections having any cross-sectional areas or shapes, including but not limited to triangles, rectangles, or any other polygons or curvilinear shapes).

In some embodiments, a packaging system may further include one or more systems for wrapping or sealing items having dunnage applied on surfaces thereof within one or more plastic wrappings or other coverings, or deposited in an appropriately sized container. For example, in some embodiments, an item having dunnage applied thereon may be passed through a wrapping system, which may envelop or otherwise wrap the item and dunnage in one or more plastic layers, and seal the item therein, e.g., by "shrink-wrapping" or heat-sealing the layers to the item and the dunnage applied thereon. In some other embodiments, an item may be manually or automatically deposited into one or more boxes or other containers and sealed therein. Items and dunnage may be sealed or otherwise enclosed within boxes or other containers in an airtight or watertight manner or, alternatively, enclosed in a manner that is neither airtight nor watertight.

In some embodiments, the packaging systems of the present disclosure may further include one or more printers or other printing systems for generating records in hard copy format to accompany one or more items, either prior to or after applying dunnage thereto and prior to sealing or otherwise enclosing an item within one or more layers or in one or more containers. Alternatively, or additionally, one or more embodiments of the packaging systems may be configured to insert one or more chips, trackers or other systems for automatically reporting a position of an item according to one or more wireless protocols or standards, e.g., Bluetooth®, Wireless Fidelity (or "Wi-Fi"), RFID, or any other protocol or standard, with the item along with dunnage, e.g., prior to or after applying dunnage thereto and prior to sealing or otherwise enclosing an item within one or more layers or in one or more containers.

Figure 2:
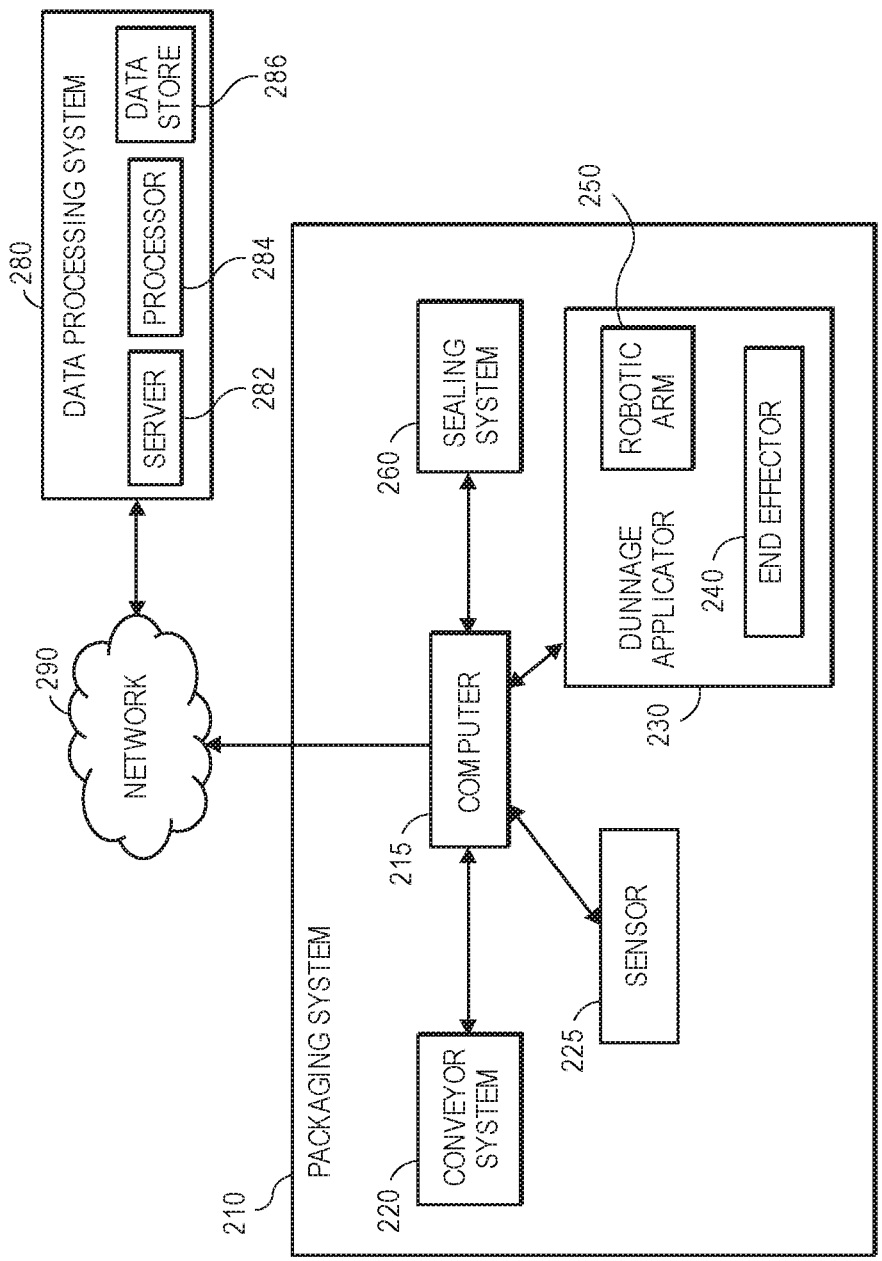
FIG. 2 is a block diagram of one system for preparing customized dunnage in accordance with embodiments of the present disclosure.

Referring to FIG. 2, a block diagram of one system for preparing customized dunnage in accordance with embodiments of the present disclosure is shown. Except where otherwise noted, reference numerals preceded by the number "2" in FIG. 2 refer to elements that are similar to elements having reference numerals preceded by the number "1" shown in FIGS. 1A through 1F.

As is shown in FIG. 2, the system includes a packaging system 210 that further includes a computer system (e.g., a computer device or server) 215, a materials handling system 220, one or more sensors 225, a dunnage applicator 230 having an end effector 240 coupled to a robotic arm 250, and a sealing system 260.

The packaging system 210 may be any facility that is configured to prepare one or more items for delivery from one location to another, with such preparations including the application of dunnage to one or more surfaces of the item. For example, the packaging system 210 may be associated with any entity or individual that intends to package one or more items with dunnage, such as a fulfillment center, a warehouse or a like facility that is adapted to receive, store, process and/or distribute items and may include one or more receiving stations, storage areas, distribution stations or the like. Alternatively, the packaging system 210 may be provided in association with any other facility, e.g., a postal facility, a shipping facility, a retail establishment or any other materials handling facility for receiving, storing, processing and/or distributing items.

The computer 215 may be one or more servers, computer devices or machines having one or more processors, memory components (e.g., databases and/or data stores) and transceivers (e.g., transmitters and receivers), as well as any number of input/output devices (not shown), such as keyboards, keypads, mice, styluses, touchscreens, RFID readers, or other devices that are configured to operate one or more order processing and/or communication systems and/or software applications having one or more user interfaces, or to communicate with one or more other computing devices or machines. For example, the computer 215 may be configured to receive information or data from, or provide information or data to, one or more of the materials handling system 220, the sensor 225, the dunnage applicator 230 or the sealing system 260, e.g., by wired or wireless connections. The computer 215 may also be configured to interpret information or data regarding one or more items that is captured by the sensor 225, e.g., to determine one or more attributes of such items, or to identify such items, and to provide one or more instructions for operating one or more of the materials handling system 220, the sensor 225, the dunnage applicator 230 or the sealing system 260 based on such information or data.

The computer 215 may be further connected to any number of other servers, computer devices or machines over a network 290, e.g., by the sending and receiving of digital data. For example, the computer 215 may be configured to transmit information or data to, or receive information or data from, one or more servers, computer devices or machines associated with a marketplace, a fulfillment center, a customer or a source of items, such as a manufacturer, a merchant, a seller, a vendor, or any other entity. The computer 215 may transmit instructions to any other computer devices or systems, or receive or transmit any other information or data to or from such devices or systems, directly or over the network 290 by any known wired or wireless means, through the sending and receiving of digital data. The protocols and components for providing communication between the computer 215 and such devices or systems are well known to those skilled in the art of computer communications and need not be described in more detail herein.

The materials handling system 220 may be configured to transport one or more items to or from the packaging system 210, such as from a receiving station or a storage area of a fulfillment center, or to a storage area or a destination station of a fulfillment center. For example, the materials handling system 220 may include any number of mover systems, diversion systems or control systems for transporting items from one or more origins to one or more destinations within the packaging system 210. In some embodiments, the materials handling system 220 may include one or more belted conveyor systems, static rail or moving rail systems, rack-and-pinion systems or the like, and such systems may be configured to transport one or more items by way of stationary carriers and moving conveyors, or moving carriers and stationary conveyors, or a combination of stationary and moving carriers. The materials handling system 220 may also include any necessary extensions and/or termini that may be associated with one or more receiving stations, storage areas, distribution stations or the packaging station at one or more locations. Additionally, the materials handling system 220 may further include one or more diversion systems for transferring items between or among carriers or conveyors, and such diversion systems may include, but are not limited to, pusher diverters, steered wheel diverters or any other type of diverters or diversion systems for transferring objects from one system to another, and at any elevation or depth. Any type of carriers, conveyors, diverters or other components may be utilized to transfer objects from one location associated with the packaging system 210 to another location associated with the packaging system 210 in accordance with the present disclosure. For example, in addition to or in lieu of a conveying system having one or more rotating parts (e.g., belts), one or more robotic arms or other systems in communication with the computer 215 may be utilized to transfer objects from one location to another.

The sensor 225 may be any form of sensing device for capturing information or data regarding conditions in or around the packaging system 210, and may be operatively or functionally joined with the computer 215 or one or more other components by any wired or wireless means. For example, the sensor 225 may be configured to read or interpret one or more external markings on an object, as well as to determine a distance from between the sensor 225 and the object. Some such external markings may include images, bar codes, QR codes, bokodes, characters, numbers, symbols, or colors that are located within a specific distance or depth of field of the sensor 225. A number or type of sensors 225 that may be provided in association with the packaging system 210 in accordance with the present disclosure, including but not limited to cameras or other optical sensors, temperature sensors, heat sensors, radiation sensors, position and/or orientation sensors, ultrasonic sensors, haptic sensors or any other types or forms of sensors, is not limited. Such sensors 225 may be provided individually or in groups or arrays of two or more sensors.

Those of ordinary skill in the pertinent art will also recognize that the sensor 225 may also be or include a camera or other imaging device configured to capture one or more images of items within its field of view or operating range, defined as a function of a distance between a sensor and a lens, viz., a focal length, including but not limited to digital cameras (e.g., an RGB color camera, a still camera, a motion capture/video camera or any other type or form of camera for capturing color, grayscale and/or black-and-white images), depth sensors, range cameras, thermal imaging cameras (e.g., infrared cameras), radiographic cameras, ultraviolet cameras, radar sensors or laser sensors, and any associated memory or storage components and processors, as well as one or more photosensitive surfaces, filters, chips, electrodes, clocks, boards, timers or any other relevant features (not shown). Where the sensor 225 is configured to capture imaging data, the imaging data may be stored in any variety of formats including, but not limited to, YUYV, RGB, RAW, .BMP, .JPEG, .GIF, or the like.

In some embodiments, the sensor 225 may be hard-mounted to or embedded within one or more surfaces of the packaging system 210 in a manner that maintains the sensors in a fixed configuration or angle with respect to one, two or three axes. Alternatively, however, the sensor 225 may be provided with one or more motors and/or controllers for manually or automatically operating one or more of the components, or for reorienting an axis or direction, i.e., by panning or tilting the sensor 225.

Information and/or data regarding features or objects expressed in a digital image captured using the sensor 225 may be extracted from the image in any number of ways. For example, a color of a pixel, or a group of pixels in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image captured using the sensor 225 may be identified using one or more computer-based methods, such as by identifying changes in intensities within regions or sectors of the image, or by defining areas of an image corresponding to specific surfaces. Furthermore, edges, contours or outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

The dunnage applicator 230 is any system that is configured to reposition or rotate an automated fabricator nozzle (e.g., a deposition nozzle) with six degrees of freedom in three-dimensional space, in order to apply dunnage to one or more surfaces of items. For example, the end effector 240 may include one or more components of an automated fabricator system, or 3D printer, including but not limited to one or more filaments, heads, blades, nozzles, motors, rollers, heat sources, radiation sources or other elements for molding, shaping, forming, curing, solidifying, depositing or otherwise applying layers of raw materials, or otherwise manipulating the raw materials, and forming an end product therefrom. The robotic arm 250 is any system that is configured to reposition or rotate the end effector 240 with six degrees of freedom in three-dimensional space, e.g., by operating a plurality of motors or other systems to reposition or rotate a plurality of arm segments in response to one or more sets of computer-based instructions. The robotic arm 250 may include any number of motors or prime movers, such as linear induction motors, or "linear motors," servo motors or other systems, such as pneumatic devices or cylinders. In some embodiments, the packaging system 210 may include any number of dunnage applicators 230, end effectors 240 and/or robotic arms 250.

The sealing system 260 may be any device or system that is configured to enclose an item with dunnage applied thereon in one or more wrappings of plastic, paper or other materials (e.g., "shrink-wrapped"), placed into a box or other container, or otherwise prepared for delivery to a designated location. For example, the sealing system 260 may include any number of spools, drums or other rotatable systems that may be operated to discharge wrappings or layers (e.g., thermoplastic film) therefrom, or to receive wrappings or layers thereon. Such spools or drums may have hubs or flanges of any diameter or width, and may be utilized to load or discharge wrappings or layers at any rates, e.g., by one or more motors. The sealing system 260 may enclose an item having dunnage thereon within one or more wrappings, layers, boxes, or other containers using one or more closing agents such as adhesive tapes or other layers, bands, belts, straps, loops or other apparatuses, shrink-wrap plastic layers, as well as one or more glues, cements or other sealing substances. In some embodiments, the sealing system 260 may include heat sealing equipment, e.g., sources of air, water or steam, or impulse heat sealer having one or more sealing bars for closing around one or more heated conductors in contact with one or more layers of material.

In accordance with the present disclosure, the sealing system 260 may seal or enclose items having dunnage applied thereon within containers such as boxes, canisters, crates, envelopes or tubes, which may be formed from any suitable material (e.g., corrugated cardboard, wood, paper, metal, plastic) and may have any standard or custom sizes. In some embodiments, the sealing system 260 may further close one or more containers with items having dunnage applied thereon with shipping tape or packing tape (e.g., strongly adhesive plastic tape that may be reinforced with one or more fiberglass or woven threads), as well as acrylic tape, polyester or polypropylene tape, filament tape, duct tape (e.g., a composite of woven fabric and polyethylene that is backed with a high-tack adhesive and may form waterproof or nearly waterproof seals), electrical tape (e.g., an elastic polyvinylchloride strip backed with a rubber-like adhesive), masking tape or painter's tape (e.g., a thin and easily torn strip of paper having a releasable pressure-sensitive adhesive backed thereon), or any other like forms of tape or other flexible adhesives. Alternatively, such containers may be sealed with any type or form of glues or cements, e.g., liquid adhesives comprising acetates, aliphatic compounds, epoxies or polyurethanes, or any other type or form of sealants. The sealing system 260 may further include one or more pumps (e.g., a vacuum pump), ejectors, blowers, valves, filters, power supplies or regulators, or any other components, as desired, for applying pressure or vacuum, or otherwise generating a differential pressure.

The computer 215 may further generate instructions for controlling operations of the materials handling system 220, the sensors 225, the dunnage applicator 230, the end effector 240, the robotic arm 250 and/or the sealing system 260, or any other aspects of the packaging system 210, e.g., or one or more receiving stations, storage areas or distribution stations.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to items to be processed using the packaging system 210, such as intrinsic attributes such as dimensions, masses, shapes or contents of the items, or extrinsic attributes such as shipping or handling restrictions of such items. The servers 282 may be connected to or otherwise communicate with the processors 284 and the data stores 286, which may store any type of information or data for any purpose. The servers 282 and/or the computer processors 284 may also connect to or otherwise communicate with the network 290, through the sending and receiving of digital data. In some embodiments, the data processing system 280 may be provided in a physical location, e.g., the same physical location as the packaging system 210. In other such embodiments, the data processing system 280 may be provided in one or more alternate or virtual locations, e.g., in a "cloud"-based environment.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Some embodiments of the systems and methods of the present disclosure may also be provided as a computer executable program product including a transitory or non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
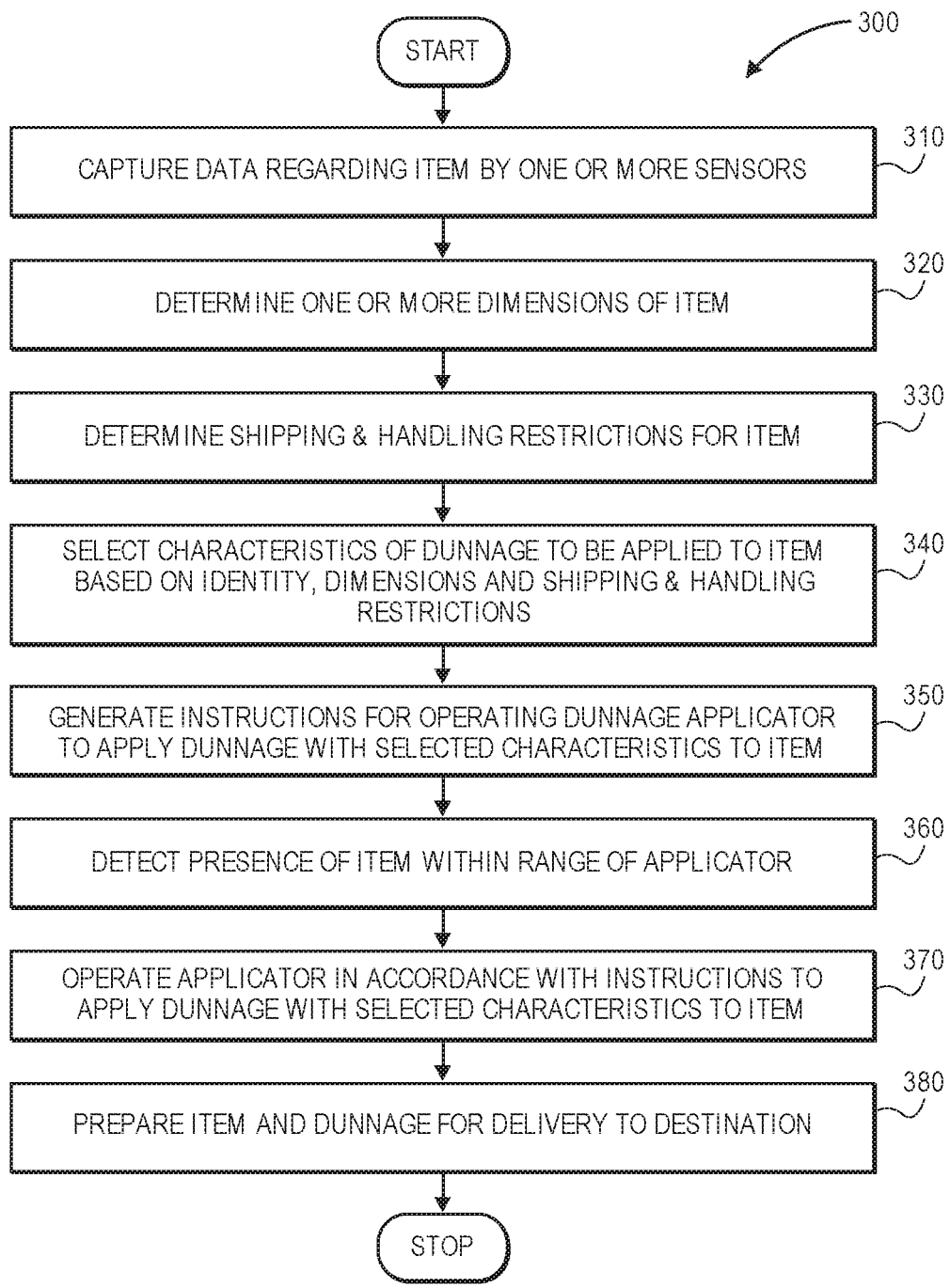
FIG. 3 is a flow chart of one process for preparing customized dunnage in accordance with embodiments of the present disclosure.

Referring to FIG. 3, a flow chart 300 of one process for preparing customized dunnage in accordance with embodiments of the present disclosure is shown.

At box 310, data regarding an item is captured using one or more sensors. For example, the sensors may include one or more imaging devices (e.g., visual imaging devices configured to capture color, grayscale or black-and-white visual imaging data, or depth imaging devices configured to capture depth or ranging data), acoustic sensors, scales or other weight sensors, scanners, readers (such as RFID readers), Bluetooth® receivers, or other sensors that may be configured to capture data regarding the item. The data may include one or more digital images, sound files, values of masses or weights, RFID signals, Bluetooth® signals or other information or data. In some embodiments, the data may be captured as the item is stationary. In other embodiments, the data may be captured as the item is in motion, e.g., on one or more conveyor systems, such as the materials handling system 120 of FIG. 1A, or as the item is being transported by one or more humans or machines, such as autonomous mobile robots.

At box 320, one or more attributes of the item are determined, and at box 330, one or more shipping or handling restrictions of the item are determined. In accordance with embodiments of the present disclosure, attributes of an item may be determined in any manner. For example, the item may be identified based on an outline, a shape, a color or one or more visible attributes of the item as depicted within imaging data captured by an imaging device; by recognizing and interpreting one or more characters, symbols, markings (e.g., bar codes) or other identifiers on the item; by capturing and interpreting one or more RFID signals from one or more RFID transmitters or tags embedded within or associated with the item; by determining a mass or weight of the item (e.g., using a scale) and correlating the mass or weight with information or data regarding the item, or in any other manner. In some embodiments, the attributes of the item may be determined based exclusively on the data captured at box 310 alone. In some embodiments, the attributes of the item may be determined based exclusively on an identity of the item, as determined from the data captured at box 310 alone. In some embodiments, the attributes of the item may be determined based on the data captured at box 310, and also based on the identity of the item. For example, a first set of attributes determined based on one of the data or the identity of the item may be compared to a second set of attributes determined based on another of the data or the identity of the item, e.g., as a confirmation or a check of the first set of attributes. Information or data regarding contents of the item (e.g., whether the item is fragile, electronic, combustible or alive, such as a plant), or regarding any environmental or physical restrictions affecting the item, such as any limits on temperatures, humidities, pressures or the like, or any limits on velocities, accelerations, vibrations or other events, may be identified based on the one or more attributes.

At box 340, characteristics of dunnage that is to be applied to the item are selected based on the identity of the item, the attributes of the item, or the shipping and handling restrictions on the item. Such attributes may include a material from which the dunnage is formed (e.g., polylactic acids, polyethylene terephthalates, glycol-modified polyethylene terephthalates, or thermoplastic polyurethanes, or any other plastics, liquids, gases, metals or other substances), a thickness of the dunnage, internal and external diameters of the dunnage, patterns or arrangements of the dunnage on one or more surfaces of the items, and any other relevant factors. In some embodiments, the characteristics of the dunnage may be selected in order to provide a snug fit within one or more wrappings, layers, boxes or other containers. In some other embodiments, the characteristics of the dunnage may be selected in order to provide a loose fit within one or more wrappings, layers, boxes or other containers. The characteristics of dunnage to be applied to the item identified at box 320 may be selected on any basis in accordance with the present disclosure.

At box 350, instructions for operating a dunnage applicator to apply the dunnage with the selected characteristics are generated. Such instructions may call for the application of the material which the dunnage is to be formed at selected temperatures and discharge rates, e.g., by applying or removing pressure to the material at one or more nozzles of a dunnage applicator. The instructions may also call for repositioning or rotating the applicator, such as by way of an end effector of a robotic arm or other system, e.g., in directions along any of three orthogonal axes, or by rotation about any of the three orthogonal axes.

At box 360, the presence of the item is detected within an operating range of the applicator. For example, in some embodiments, the item may have been manually placed within a vicinity of the applicator, or delivered to within the vicinity of the applicator by a conveying system or other automated system. The item may be detected within the vicinity of the applicator by a motion sensor, imaging device, LIDAR system, weight sensor or other sensor associated with the applicator or by one or more systems not directly coupled to or associated with the applicator, e.g., an encoder of a conveying system, or in any other manner.

At box 370, the applicator is operated in accordance with the instructions generated at box 350 to apply dunnage with the characteristics selected at box 340 to one or more surfaces of the item. For example, the material may be discharged in a liquid or semi-liquid state, e.g., by extrusion, from the applicator to selected surfaces at selected discharge rates, and in selected locations or patterns on the selected surfaces. In some embodiments, the material may be allowed to harden or solidify to a desired degree, e.g., based on ambient environmental conditions, or by one or more conductive, convective or radiative sources of heating or cooling, either with the item in place within the vicinity of the applicator, or at another fixed or mobile location.

At box 380, the item and dunnage are prepared for delivery to a destination, and the process ends. For example, the item may be enveloped in a wrapping of plastic, paper or other materials (e.g., "shrink-wrapped"), placed into a box or other container, or otherwise prepared for delivery to a designated location, such as a receiving station, a storage area or a distribution station of a materials handling facility, or a location specified by a customer in one or more orders of items. In some embodiments, the item need not be wrapped or placed in a container after the dunnage is applied, and may be transported to another location without any such wrappings or layers, or outside of any containers.

Figure 4:
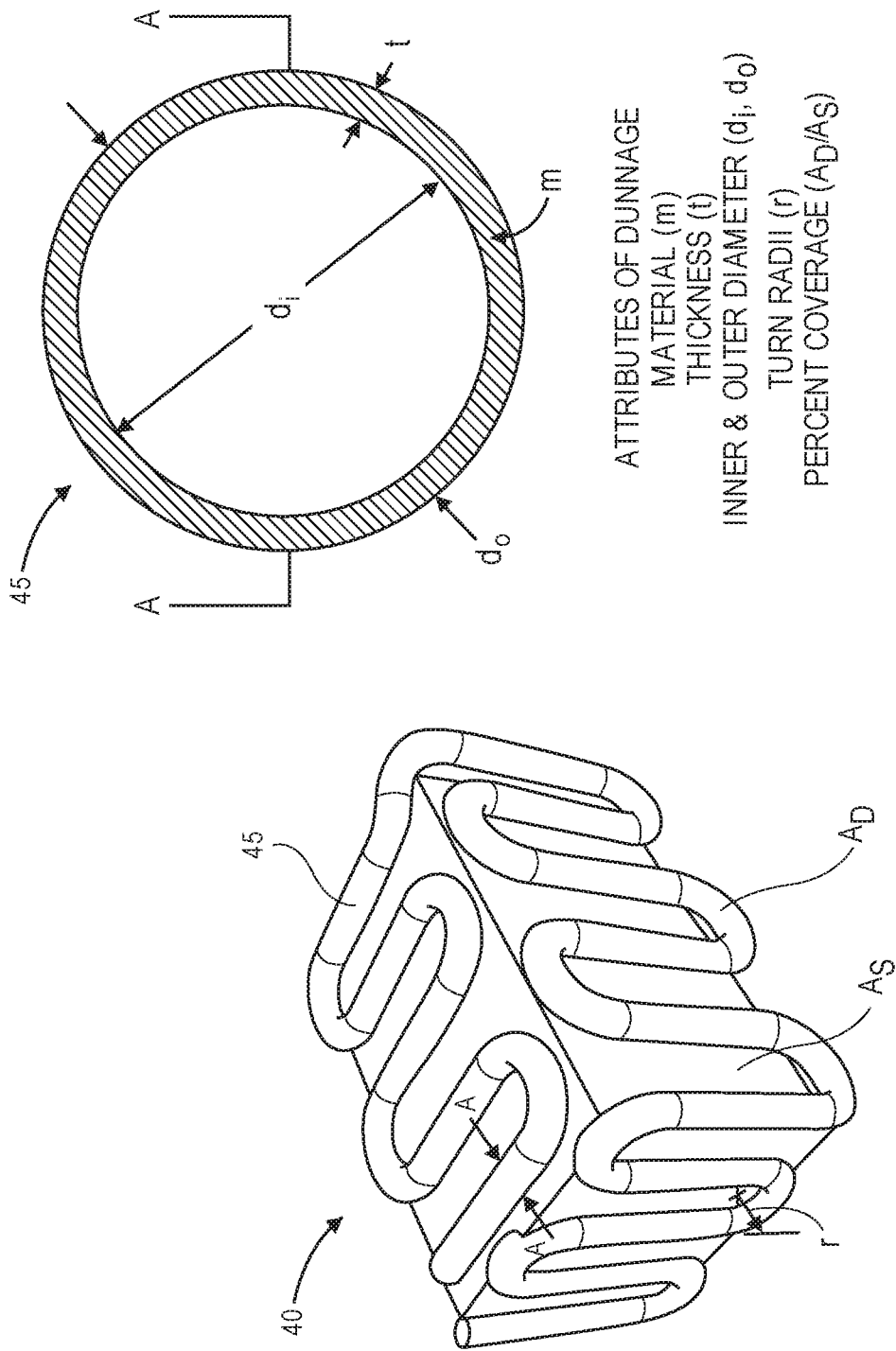
FIG. 4 is a view of aspects of one system for utilizing customized dunnage prepared in accordance with embodiments of the present disclosure.

As is discussed above, characteristics of dunnage to be applied to surfaces of items may be selected on any basis. Referring to FIG. 4, views of aspects of one system for utilizing customized dunnage prepared in accordance with embodiments of the present disclosure is shown. Except where otherwise noted, reference numerals preceded by the number "4" in FIG. 4 refer to elements that are similar to elements having reference numerals preceded by the number "2" in FIG. 2 or by the number "1" shown in FIGS. 1A through 1F.

As is shown in FIG. 4, an item 40 may have a line or series of tubular or tube-like sections of dunnage 45 applied to one or more external surfaces in any selected pattern or arrangement, e.g., linear sections connected by a series of curvilinear (e.g., C-shaped, U-shaped or S-shaped) sections. The one or more sections of the dunnage 45 may be formed on surfaces of the item 40 in liquid or semi-liquid states, e.g., by deposition nozzle of automated fabricator systems that may be operated with six degrees of freedom in three-dimensional space.

One or more characteristics of the dunnage 45 may be selected on any basis, including but not limited to one or more intrinsic or extrinsic attributes of the item, such as dimensions, masses, shapes or contents of the item 40, or shipping or handling restrictions on the item 40. For example, a material m from which the dunnage 45 is to be formed may be selected or determined based on one or more of such attributes, such as to ensure that the item 40 remains intact during delivery, or may withstand one or more impacts, shocks or other adverse physical effects. Dimensions of the dunnage 45, such as a thickness t of the dunnage 45, an inner diameter $d_i$ of the dunnage, or an outer diameter $d_o$ of the dunnage 45, may also be selected or determined based on one or more of such attributes. Other dimensions of the dunnage 45, e.g., turn radii r or percents or ratios of coverage by the area $A_D$ of the dunnage 45 to the area $A_S$ of the surface of the item 40, may also be selected or determined based on one or more of such attributes.

Dunnage may also be applied in patterns that may be selected based on one or more intrinsic attributes of an item. Referring to FIGS. 5A through 5D, views of aspects of processes for preparing customized dunnage in accordance with embodiments of the present disclosure are shown. Except where otherwise noted, reference numerals preceded by the number "5" in FIGS. 5A through 5D refer to elements that are similar to elements having reference numerals preceded by the number "4" in FIG. 4, by the number "2" in FIG. 2 or by the number "1" shown in FIGS. 1A through 1F.

As is shown in FIG. 5A, where an item 50A (viz., a vase) includes fragile contents such as glass, ceramics, crystals or others, an end effector 540A having a nozzle (e.g., a deposition nozzle) 542A of an automated fabricator system disposed therein may be manipulated with six degrees of freedom in three-dimensional space to apply dunnage 55A having a comparatively large diameter in a pattern $P_{5A}$ that covers one or more select surfaces of the item 50A (e.g., each of the surfaces of the item 50A, or surfaces corresponding to particularly fragile aspects of the item 50A). The large-diameter dunnage 55A is applied along a perimeter of the item 50A, e.g., along edges between faces of the item 50A, to provide an extended buffer between the item 50A and a container into which the item 50A and dunnage 55A may be subsequently deposited. Additionally, a material from which the dunnage 55A is formed, or one or more dimensions of the nozzle 542A, may be selected to provide sufficient protection to the one or more surfaces of the item 50A.

As is shown in FIG. 5B, where an item 50B (viz., a book) does not include any particularly fragile contents, an end effector 540B having a nozzle (e.g., a deposition nozzle) 542B of an automated fabricator system disposed therein may be manipulated with six degrees of freedom in three-dimensional space to apply dunnage 55B having a comparatively small diameter in a pattern $P_{5B}$ that follows an edge of the item 50B (e.g., a spine or binding) and also covers one or more select surfaces of the item 50B, such as a front side and/or a back side of the item 50B. Because edges and surfaces of books are typically tender or fragile, the small-diameter dunnage 55B may provide a limited buffer between the item 50B and a container into which the item 50B and dunnage 55B may be subsequently deposited. Additionally, a material from which the dunnage 55B is formed, or one or more dimensions of the nozzle 542B, may be selected to provide sufficient protection to the one or more surfaces of the item 50B.

Figure 5C:
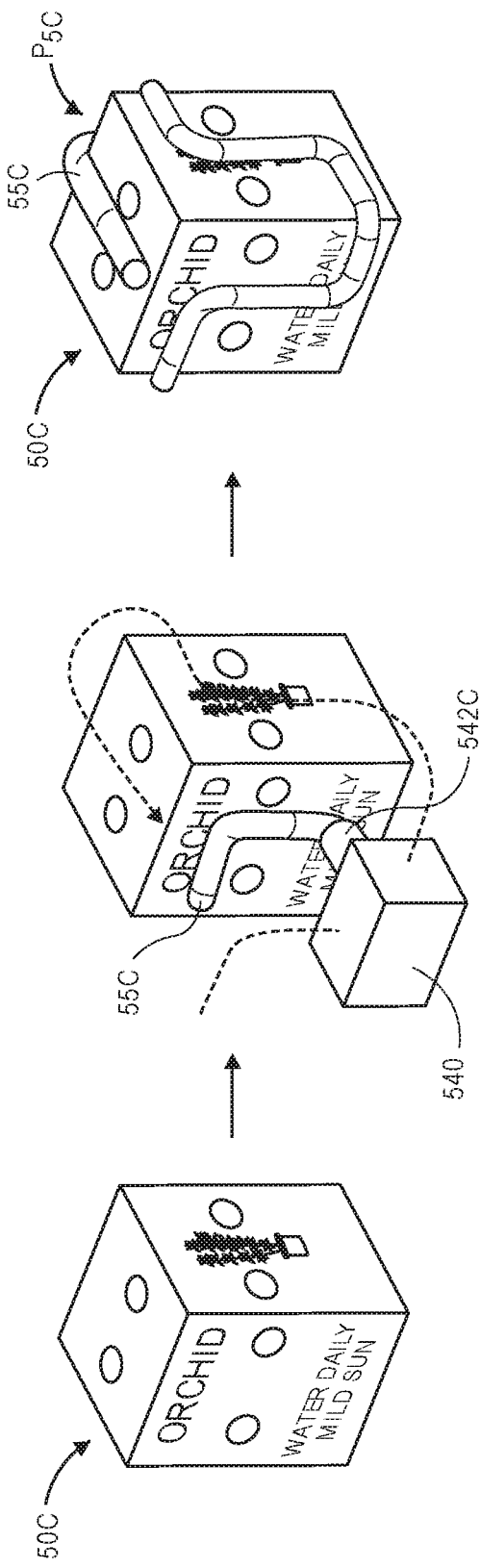

As is shown in FIG. 5C, where an item 50C (viz., an orchid) is alive, or has specific ventilation or other environmental requirements, an end effector 540C having a nozzle (e.g., a deposition nozzle) 542C of an automated fabricator system disposed therein may be manipulated with six degrees of freedom in three-dimensional space to apply dunnage 55C in a pattern $P_{5C}$ that satisfies, or does not conflict with, any of the specific ventilation or other environmental requirements. For example, where the item 50C has a number of openings to enable air flow or sunlight to pass therethrough, the pattern $P_{5C}$ may be selected to ensure that the dunnage 55C does not cover any of the openings. Additionally, a material from which the dunnage 55C is formed, or one or more dimensions of the nozzle 542C, may be selected to provide sufficient protection to the one or more surfaces of the item 50C.

Figure 5D:
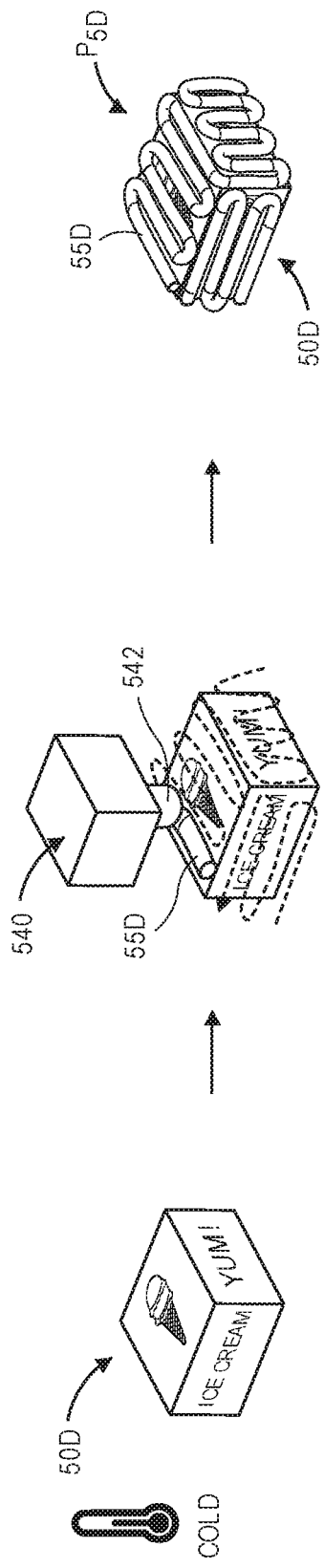

As is shown in FIG. 5D, where an item 50D (viz., a frozen food) must be maintained at a selected temperature or within a selected temperature band or range, an end effector 540D having a nozzle (e.g., a deposition nozzle) 542D of an automated fabricator system disposed therein may be manipulated with six degrees of freedom in three-dimensional space to apply dunnage 55D in a pattern $P_{5D}$ that provides sufficient insulation to surfaces of the item 50D. For example, as is shown in FIG. 5D, the dunnage 55D may be applied with tight turn radii and may cover all or substantial portions of surfaces of the item 50D, in order to maintain the item 50D at the selected temperature or within the selected temperature band or range. Additionally, a material from which the dunnage 55D is formed, or one or more dimensions of the nozzle 542D, may be selected to provide sufficient protection to the one or more surfaces of the item 50D.

Figure 6A:
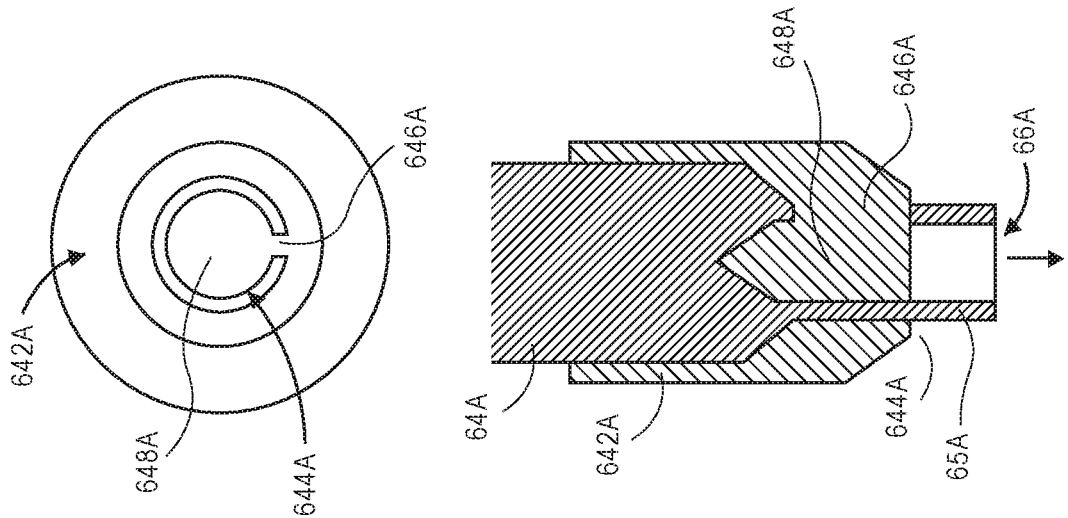
FIGS. 6A and 6B are views of aspects of systems for preparing customized dunnage in accordance with embodiments of the present disclosure.
Figure 6A:
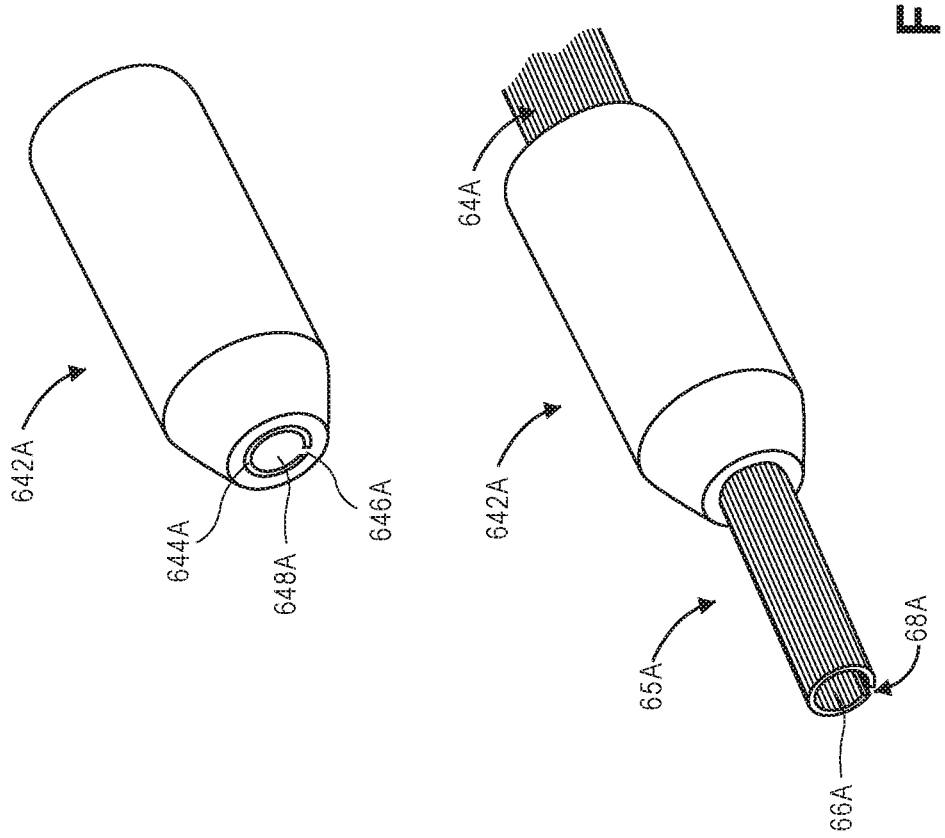
Figure 6B:
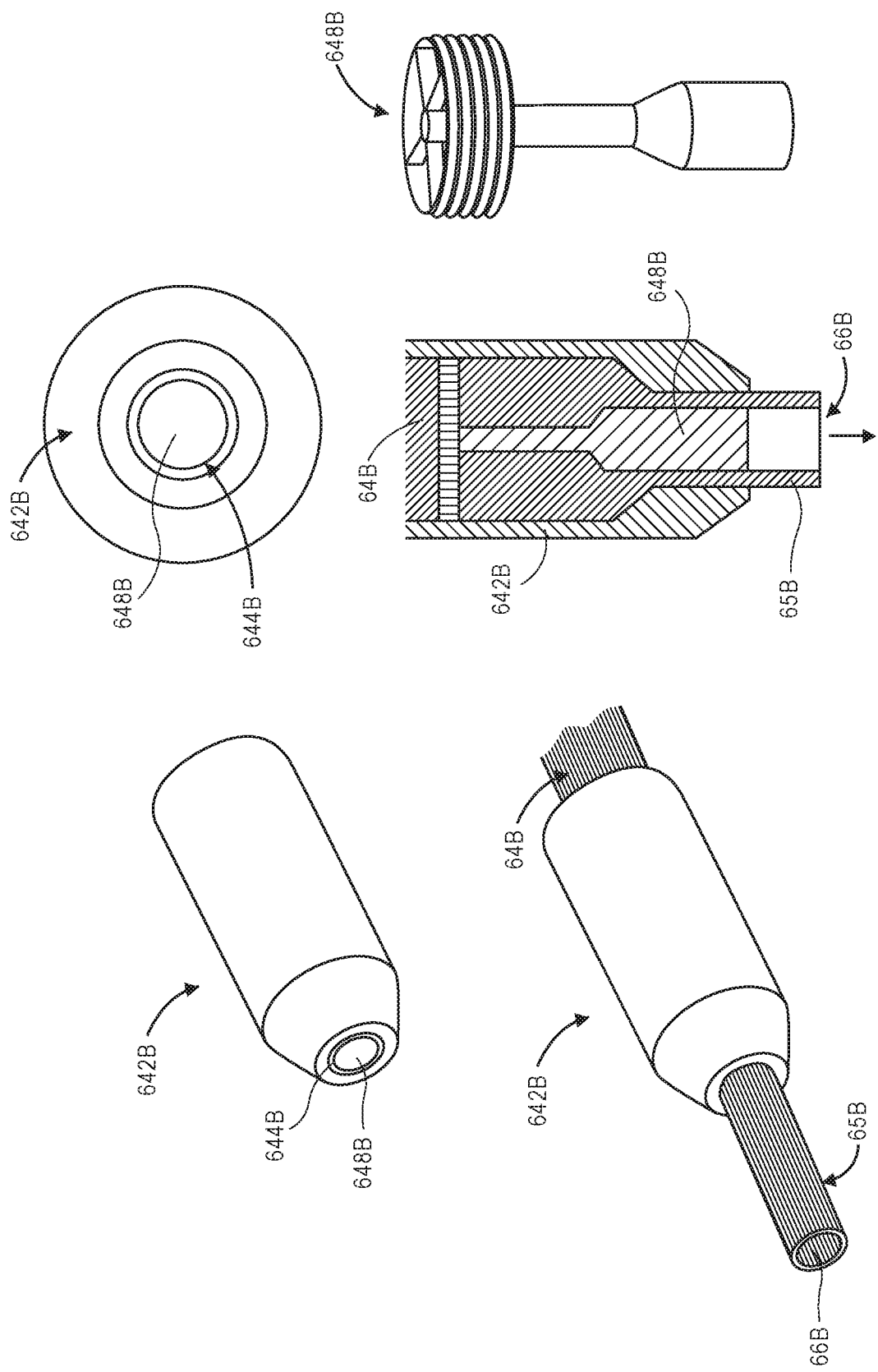

Nozzles for applying dunnage using automated fabricator systems that are manipulated with six degrees of freedom in three-dimensional space may have dimensions or other features that are selected on any basis. Referring to FIGS. 6A and 6B, views of aspects of systems for preparing customized dunnage in accordance with embodiments of the present disclosure are shown. Except where otherwise noted, reference numerals preceded by the number "6" in FIGS. 6A and 6B refer to elements that are similar to elements having reference numerals preceded by the number "5" in FIGS. 5A through 5D, by the number "4" in FIG. 4, by the number "2" in FIG. 2 or by the number "1" shown in FIGS. 1A through 1F.

As is shown in FIG. 6A, a nozzle (e.g., a deposition nozzle) 642A has a substantially cylindrical shape, with an outlet 644A provided in a substantially frustoconical tip. The outlet 644A has a nearly circular shape defined by a plug (or centerbody) 648A, which is substantially flat and disc-shaped. The shape of the outlet 644A is broken by a connector 646A by which the plug 648A is joined to the nozzle 642A on the frustoconical tip.

Due to the nearly circular shape of the opening 644A, the nozzle 642A may be used to generate substantially tubular dunnage 65A by extrusion, e.g., by supplying raw materials 64A into an inlet of the nozzle 642A. The dunnage 65A has the shape of an incomplete cylinder, or a substantially complete cylinder, having a substantially hollow opening 66A defined by the plug 648A and a break 68A defined by the connector 646A. The break 68A runs a length of any line or section of the dunnage 65A generated thereby.

As is shown in FIG. 6B, a nozzle (e.g., a deposition nozzle) 642B has a substantially cylindrical shape, with an outlet 644B provided in a substantially frustoconical tip. The outlet 644B has a circular shape defined by a distal end of a plug (or centerbody) 648B, which has a proximate end mounted within an inlet to the nozzle 642B. Due to the two-piece construction of the nozzle 642B, or by mounting the plug 648B within the inlet to the nozzle 642B, the shape of the outlet 644B is an unbroken circle.

Due to the circular shape of the opening 644B, the nozzle 642B may be used to generate tubular dunnage 65B by extrusion, e.g., by supplying raw materials 64B into the inlet of the nozzle 642B. The dunnage 65B has the shape of a complete cylinder, with a hollow opening defined by the plug 648B without any breaks along a length of any line or section of the dunnage 65B generated thereby.

Figure 7:
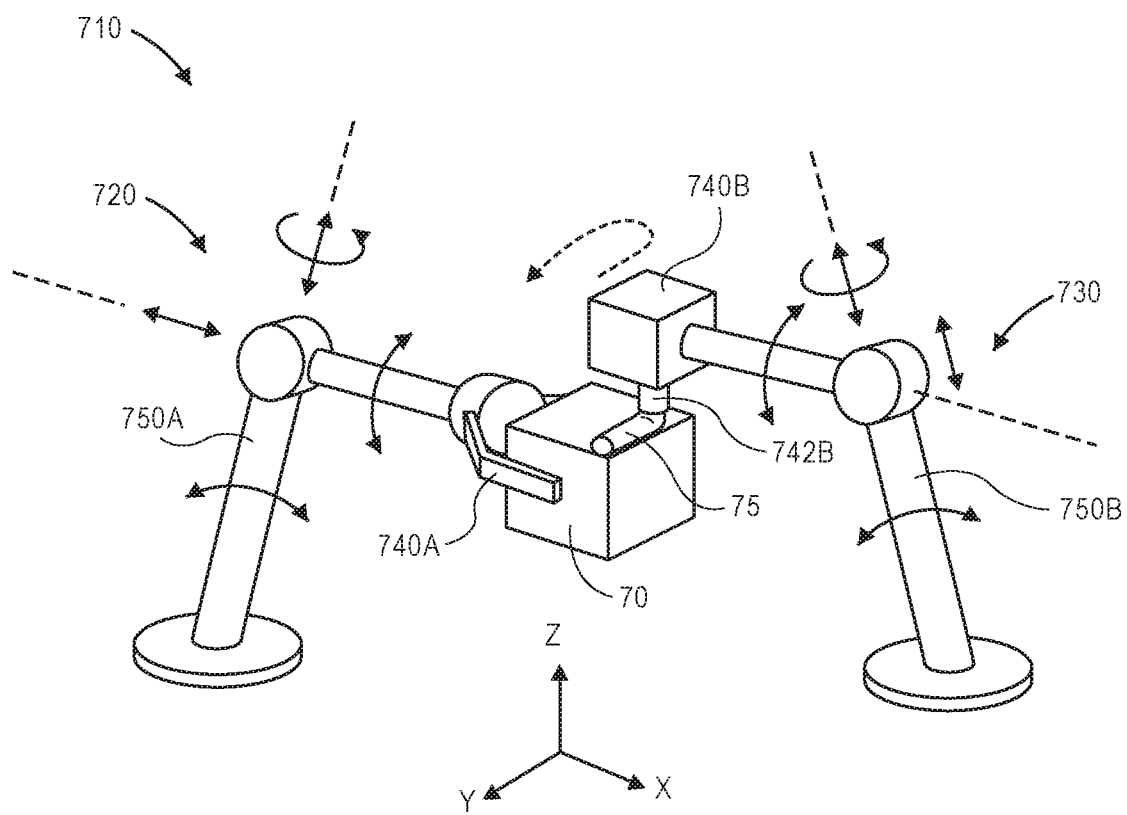
FIG. 7 is a view of aspects of one system for preparing customized dunnage in accordance with embodiments of the present disclosure.

In some embodiments, an item may be manipulated, and dunnage may be applied to the item, using robotic arms having end effectors that are configured to operate with respect to six degrees of freedom in three-dimensional space. Referring to FIG. 7, a view of aspects of one system for preparing customized dunnage in accordance with embodiments of the present disclosure is shown. Except where otherwise noted, reference numerals preceded by the number "7" in FIG. 7 refer to elements that are similar to elements having reference numerals preceded by the number "6" in FIGS. 6A and 6B, by the number "5" in FIGS. 5A through 5D, by the number "4" in FIG. 4, by the number "2" in FIG. 2 or by the number "1" shown in FIGS. 1A through 1F.

As is shown in FIG. 7, a system 710 includes a manipulator system 720 and a dunnage applicator 730. The manipulator system 720 includes an end effector 740A that is coupled to a robotic arm 750A and configured to be manipulated with six degrees of freedom in three-dimensional space. The end effector 740A includes a claw, an anthropomorphic grip, or another component for engaging with an item 70, and may be repositioned or rotated, e.g., in directions along any of three orthogonal axes, or by rotation about any of the three orthogonal axes, to place the item 70 in any desired configuration or orientation.

The dunnage applicator 730 further includes an end effector 740B that is coupled to a robotic arm 750B and configured to be manipulated with six degrees of freedom in three-dimensional space. The end effector 740B includes a nozzle 742B of an automated fabricator system that may be repositioned or rotated, e.g., in directions along any of three orthogonal axes, or by rotation about any of the three orthogonal axes, to apply dunnage 75 to the item 70 in any desired configuration or orientation. Each of the manipulator system 720 and the dunnage applicator 730 may be operated independently or in concert with one another, and in response to one or more sets of computer instructions, to place the item 70 in one or more desired orientations or alignments by the manipulator system 720 and to apply one or more lines or sections of dunnage 75 on surfaces of the item 70.

Figure 8A:
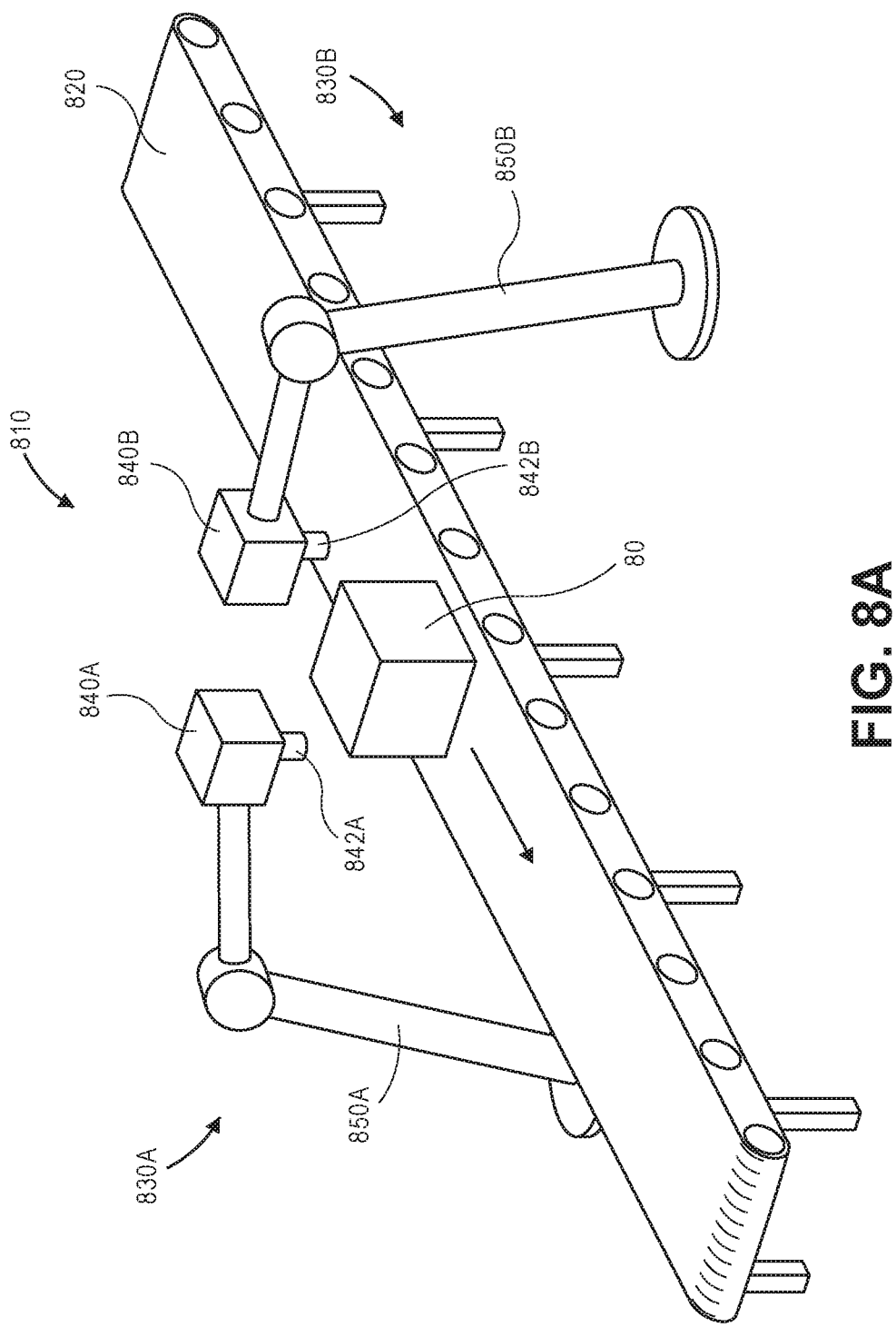
FIGS. 8A and 8B are views of aspects of one system for preparing customized dunnage in accordance with embodiments of the present disclosure.
Figure 8B:
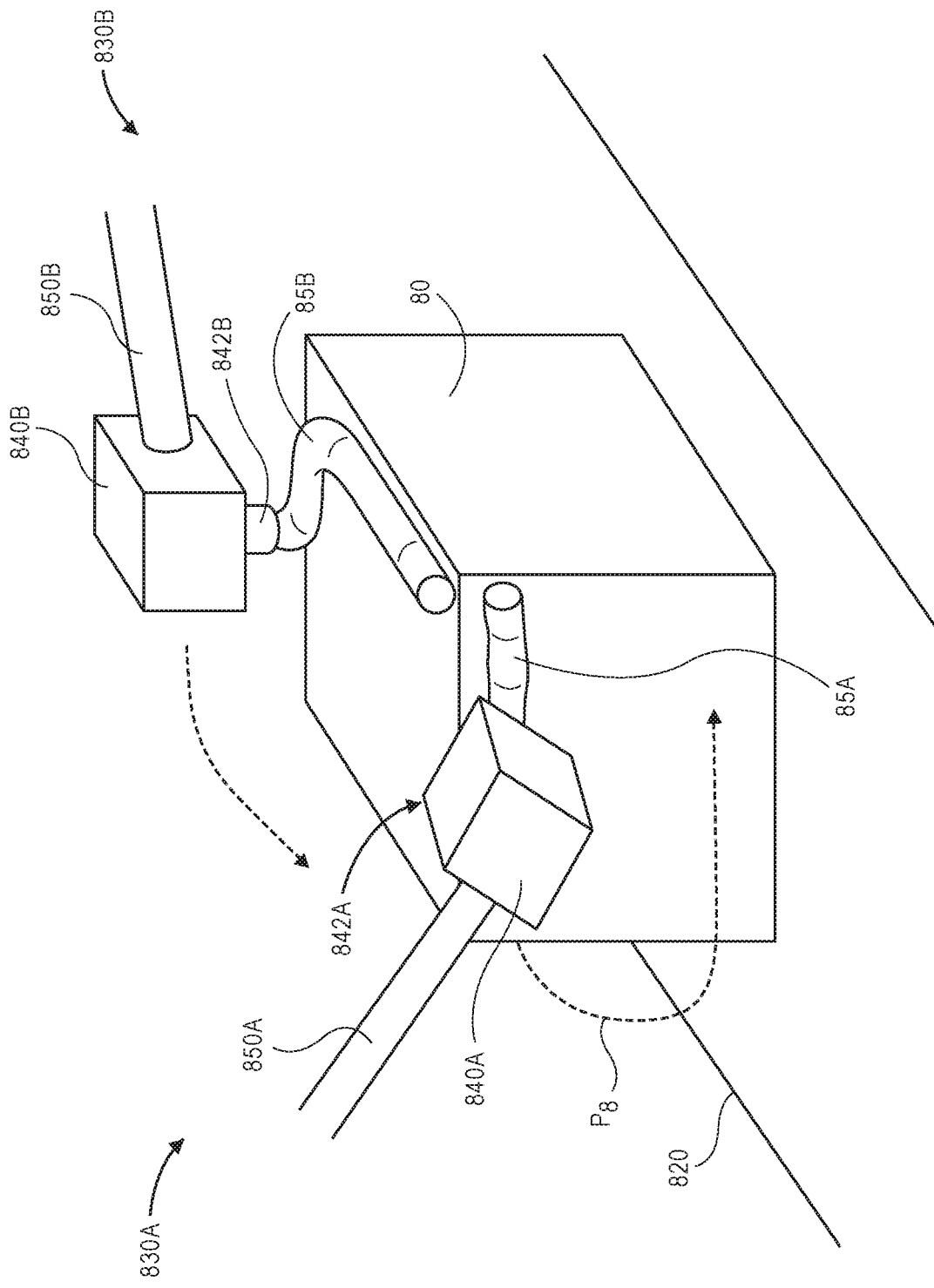

In some embodiments, dunnage may be applied to items using two or more robotic arms having end effectors that are configured to operate with respect to six degrees of freedom in three-dimensional space. Referring to FIGS. 8A and 8B, a view of aspects of one system for preparing customized dunnage in accordance with embodiments of the present disclosure is shown. Except where otherwise noted, reference numerals preceded by the number "8" in FIGS. 8A and 8B refer to elements that are similar to elements having reference numerals preceded by the number "7" in FIG. 7, by the number "6" in FIGS. 6A and 6B, by the number "5" in FIGS. 5A through 5D, by the number "4" in FIG. 4, by the number "2" in FIG. 2 or by the number "1" shown in FIGS. 1A through 1F.

As is shown in FIG. 8A, a system 810 includes a materials handling system 820 (e.g., one or more conveyors) and a pair of dunnage applicators 830A, 830B. Each of the dunnage applicators 830A, 830B includes an end effector 840A, 840B having a nozzle 842A, 842B of an automated fabricator system that may be repositioned or rotated, e.g., in directions along any of three orthogonal axes, or by rotation about any of the three orthogonal axes, to apply dunnage to an item 80 traveling on the materials handling system 820.

As is shown in FIG. 8B, each of the dunnage applicators 830A, 830B may be operated independently or in concert with one another, and in response to one or more sets of computer instructions. For example, as is shown in FIG. 8B, the dunnage applicator 830A may be operated to apply one or more lines or sections of dunnage 85A on surfaces of the item 80, e.g., while the item 80 is stationary or in motion. Independently, or concurrently, the dunnage applicator 830B may be operated to apply one or more lines or sections of dunnage 85B on the same surfaces of the item 80, or on different surfaces, while the item 80 is stationary or in motion.

Figure 9A:
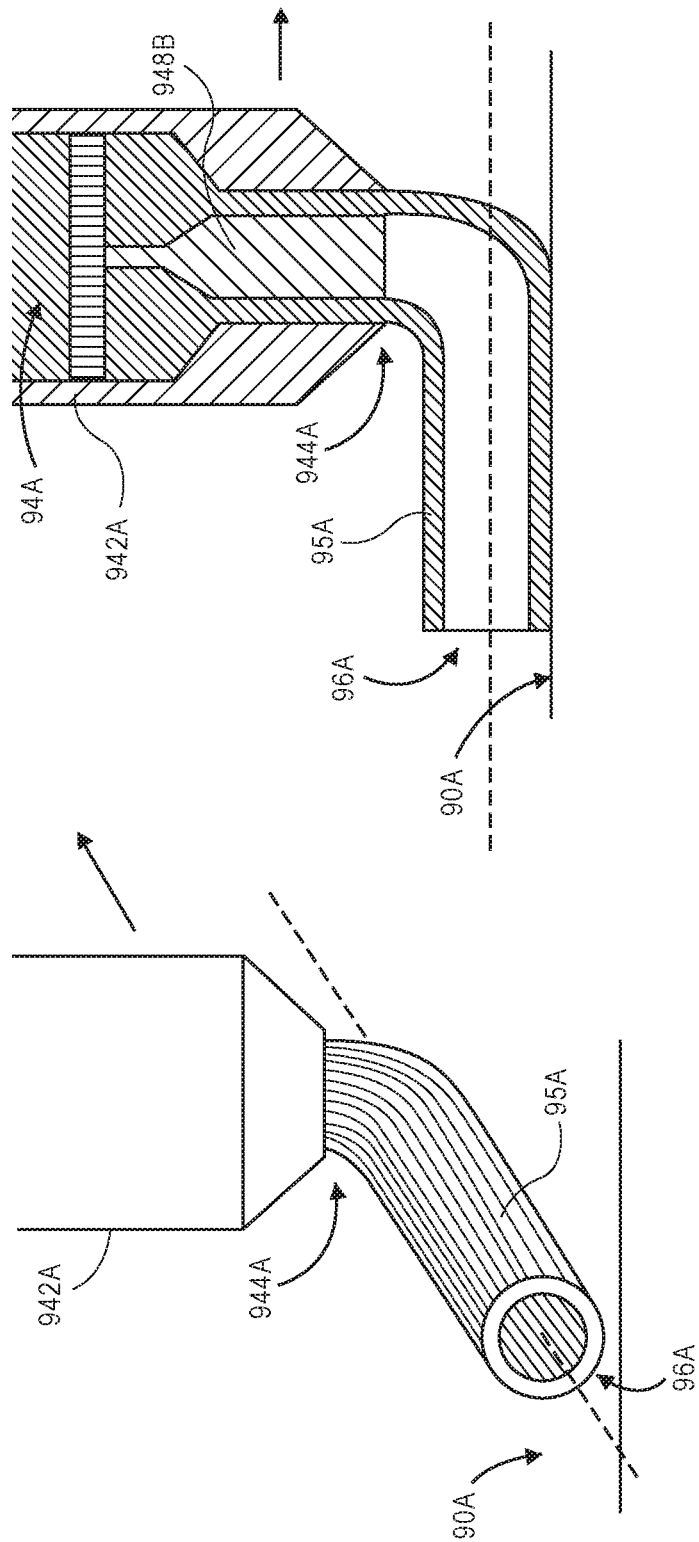
FIGS. 9A and 9B are views of aspects of systems for preparing customized dunnage in accordance with embodiments of the present disclosure.
Figure 9B:
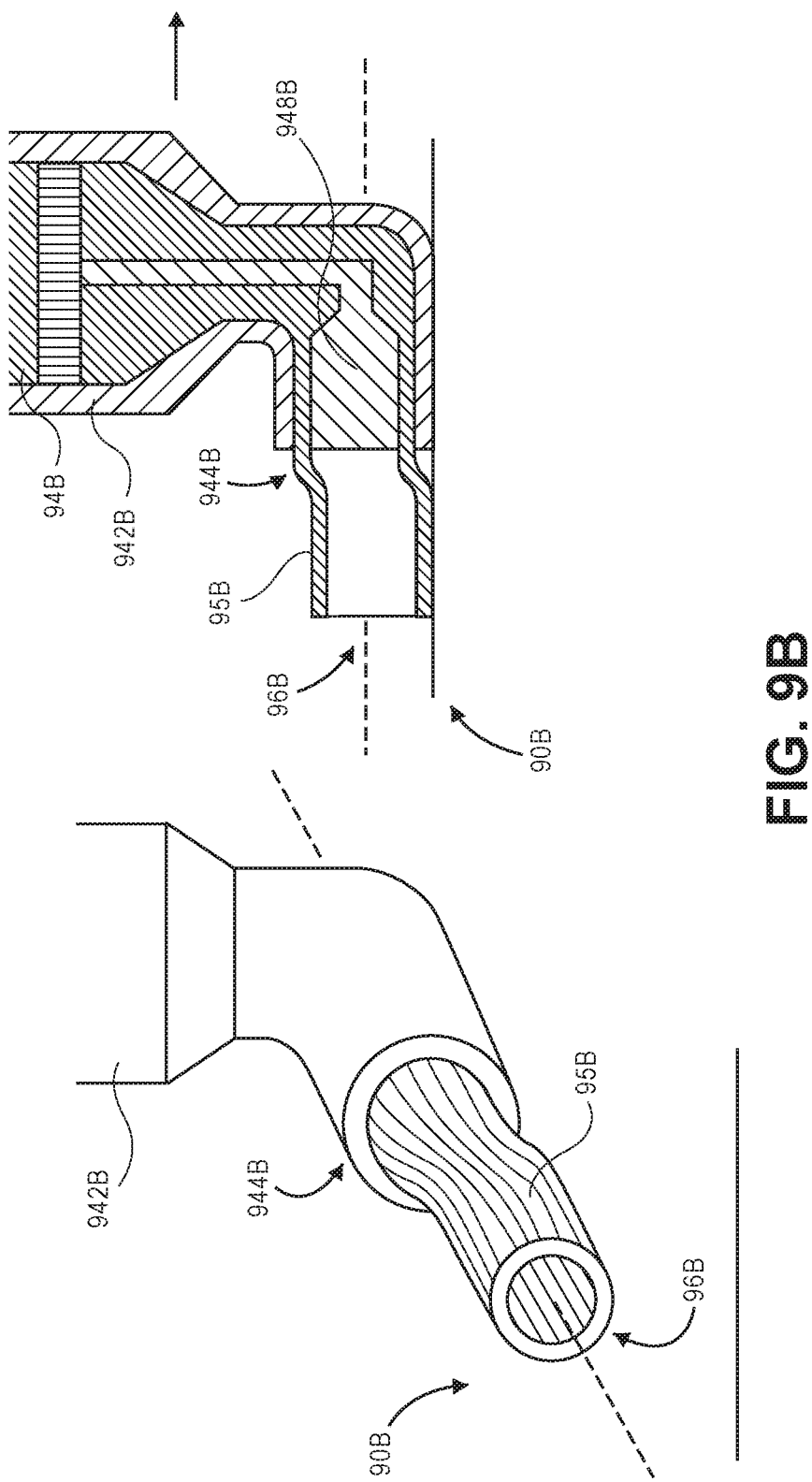

Dunnage may be applied to surfaces of items using nozzles that are oriented at any angles with respect to surfaces of the items. Referring to FIGS. 9A and 9B, views of aspects of systems for preparing customized dunnage in accordance with embodiments of the present disclosure are shown. Except where otherwise noted, reference numerals preceded by the number "9" in FIGS. 9A and 9B refer to elements that are similar to elements having reference numerals preceded by the number "8" in FIGS. 8A and 8B, by the number "7" in FIG. 7, by the number "6" in FIGS. 6A and 6B, by the number "5" in FIGS. 5A through 5D, by the number "4" in FIG. 4, by the number "2" in FIG. 2 or by the number "1" shown in FIGS. 1A through 1F.

As is shown in FIG. 9A, a nozzle 942A has an outlet 944A having an axis that is aligned substantially normal to a surface of an item 90A, and configured to apply one or more lines or sections 96A upon the surface of the item 90A as the nozzle 942A moves in one or more straight or curvilinear lines. The nozzle 942A has a substantially cylindrical shape, with the outlet 944A provided in a substantially frustoconical tip. The outlet 944A has a circular shape defined by a distal end of a plug (or centerbody) 948A, which has a proximate end mounted within an inlet to the nozzle 942A. Due to the two-piece construction of the nozzle 942A and the plug 948A, a shape of the outlet 944A is an unbroken circle, and the nozzle 942A may be used to generate tubular dunnage 95A by extrusion, e.g., by supplying raw materials 94A into the inlet of the nozzle 942A. The dunnage 95A has the shape of a complete cylinder, without any breaks along a length of any line or section of the dunnage 95A generated thereby.

Because the nozzle 942A is aligned in a vertically downward orientation with respect to the surface of the item 90A, the dunnage 95A that departs the nozzle 942A and is applied to a surface of the item 90A is subject to bending by approximately ninety degrees (90°), which may result in temporary compression effects on upper surfaces of the dunnage 95A and temporary tensile effects on lower surfaces of the dunnage 95A as the dunnage 95A is applied to the item 90A.

As is shown in FIG. 9B, a nozzle 942B has an outlet 944B having an axis that is aligned substantially parallel to a surface of an item 90B, and configured to apply one or more lines or sections 96B upon the surface of the item 90B as the nozzle 942B moves in one or more straight or curvilinear lines. The nozzle 942B has a substantially cylindrical shape, with the outlet 944B provided in a substantially flat tip. The outlet 944B has a circular shape defined by a distal end of a plug (or centerbody) 948B, which has a proximate end mounted within an inlet to the nozzle 942B. Due to the two-piece construction of the nozzle 942B and the plug 948B, a shape of the outlet 944B is an unbroken circle, and the nozzle 942B may be used to generate tubular dunnage 95B by extrusion, e.g., by supplying raw materials 94B into the inlet of the nozzle 942B. The dunnage 95B has the shape of a complete cylinder, without any breaks along a length of any line or section of the dunnage 95B generated thereby.

Because the axis of the nozzle 942B is aligned in a parallel orientation with respect to the surface of the item 90B, the dunnage 95B that departs the nozzle 942B and is applied to a surface of the item 90B is subject to minimal bending, and therefore with minimal compression or tensile effects on any surfaces of the dunnage 95B as the dunnage 95B is applied to the item 90B.

Figure 10A:
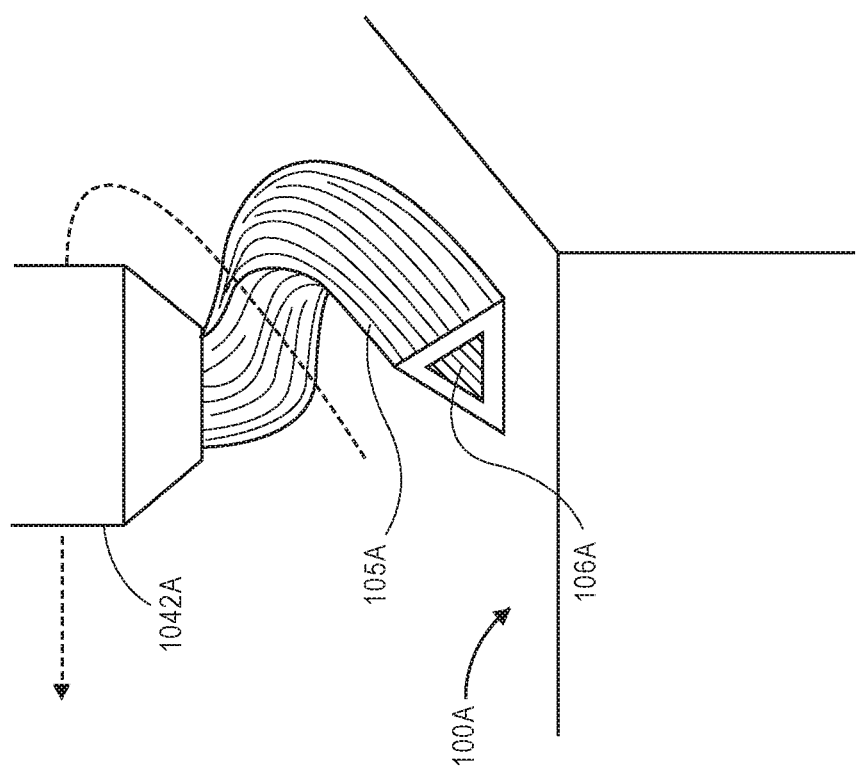
FIGS. 10A through 10C are views of aspects of systems for preparing customized dunnage in accordance with embodiments of the present disclosure.
Figure 10A:
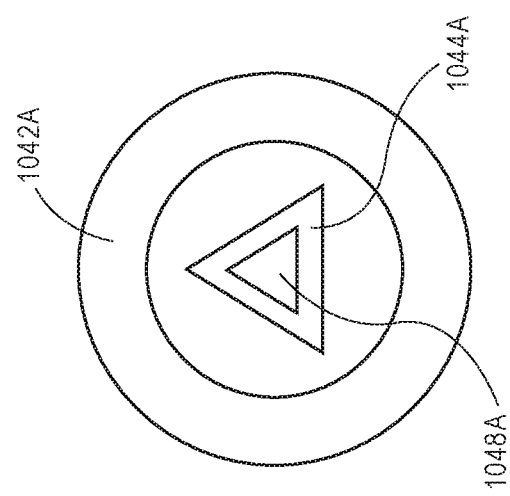
Figure 10B:
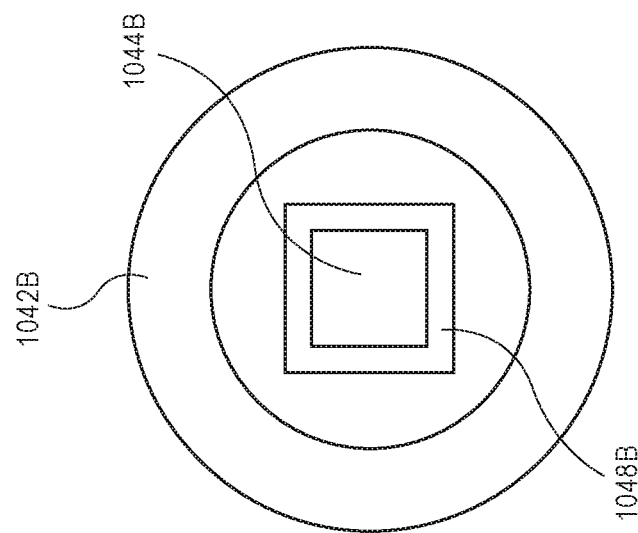
Figure 10B:
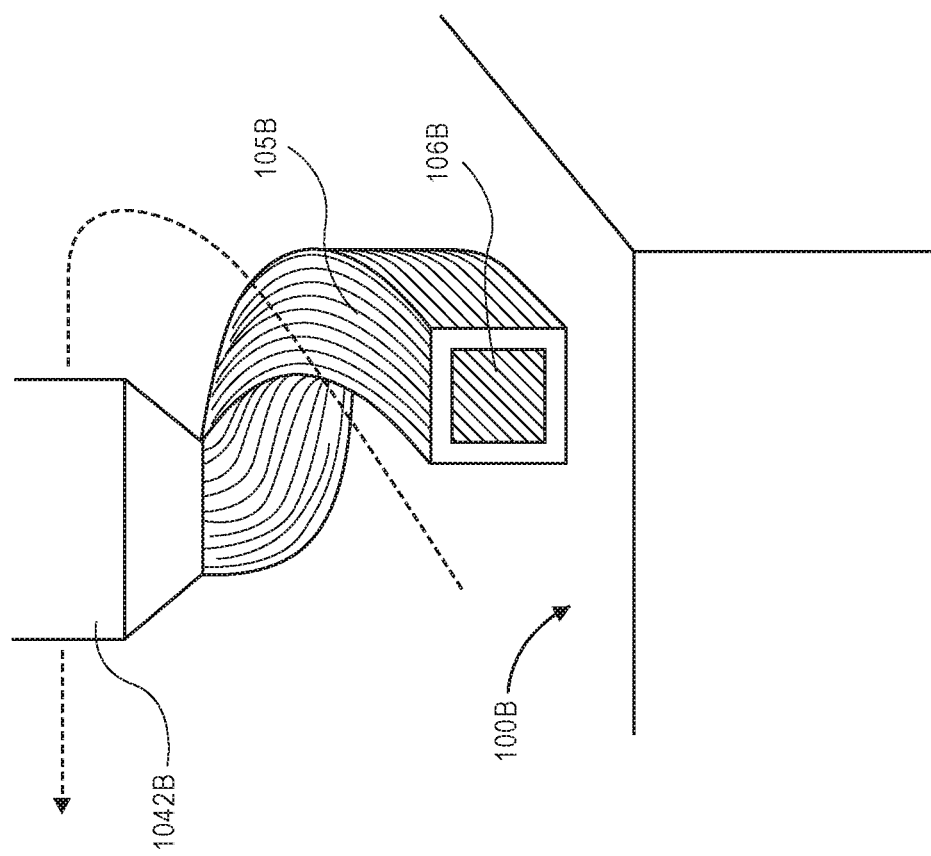
Figure 10C:
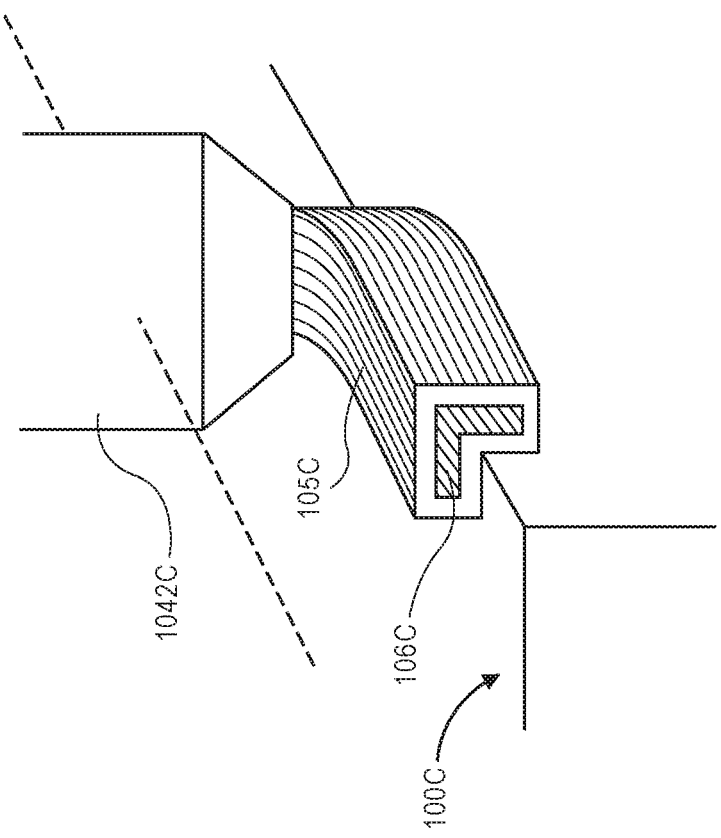
Figure 10C:
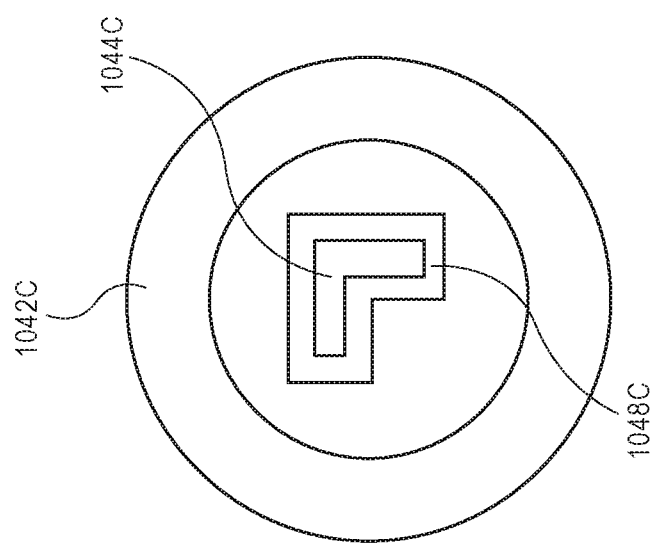

As is discussed above, dunnage may be applied to surfaces of items using nozzles having any shape or cross-sectional area. Referring to FIGS. 10A through 10C, views of aspects of systems for preparing customized dunnage in accordance with embodiments of the present disclosure are shown. Except where otherwise noted, reference numerals preceded by the number "10" in FIGS. 10A through 10C refer to elements that are similar to elements having reference numerals preceded by the number "9" in FIGS. 9A and 9B, by the number "8" in FIGS. 8A and 8B, by the number "7" in FIG. 7, by the number "6" in FIGS. 6A and 6B, by the number "5" in FIGS. 5A through 5D, by the number "4" in FIG. 4, by the number "2" in FIG. 2 or by the number "1" shown in FIGS. 1A through 1F.

As is shown in FIG. 10A, a nozzle 1042A has an outlet 1044A having a triangular cross-section. The nozzle 1042A has a substantially cylindrical shape, with the outlet 1044A provided in a substantially frustoconical tip. The triangular shape of the outlet 1044A is defined by a distal end of a plug (or centerbody) 1048A. Where the nozzle 1042A is aligned with an axis that is substantially normal to a surface of an item 100A, the nozzle 1042A may apply one or more lines or sections of dunnage 106A upon the surface of the item 100A as the nozzle 1042A moves in one or more straight or curvilinear lines. Due to the shape of the outlet 1044A, the nozzle 1042A may be used to generate hollow, triangularly-shaped dunnage 105A by extrusion, e.g., by supplying raw materials 104A into the inlet of the nozzle 1042A. The dunnage 105A has the shape of a complete triangular hollow, without any breaks along a length of any line or section of the dunnage 105A generated thereby.

As is shown in FIG. 10B, a nozzle 1042B has an outlet 1044B having a square cross-section. The nozzle 1042B has a substantially cylindrical shape, with the outlet 1044B provided in a substantially frustoconical tip. The square shape of the outlet 1044B is defined by a distal end of a plug (or centerbody) 1048B. Where the nozzle 1042B is aligned with an axis that is substantially normal to a surface of an item 100B, the nozzle 1042B may apply one or more lines or sections of dunnage 106B upon the surface of the item 100B as the nozzle 1042B moves in one or more straight or curvilinear lines. Due to the shape of the outlet 1044B, the nozzle 1042B may be used to generate hollow, square-shaped dunnage 105B by extrusion, e.g., by supplying raw materials 104B into the inlet of the nozzle 1042B. The dunnage 105B has the shape of a complete square hollow, without any breaks along a length of any line or section of the dunnage 105B generated thereby.

As is shown in FIG. 10C, a nozzle 1042C has an outlet 1044C having an L-shaped cross-section. The nozzle 1042C has a substantially cylindrical shape, with the outlet 1044C provided in a substantially frustoconical tip. The L-shaped outlet 1044C is defined by a distal end of a plug (or centerbody) 1048C. Where the nozzle 1042C is aligned with respect to an edge of an item 100C, the nozzle 1042C may apply one or more lines or sections of dunnage 106C upon the edge of the item 100C (e.g., upon adjacent surfaces defining the edge of the item 100C) as the nozzle 1042C moves in one or more straight or curvilinear lines. Due to the shape of the outlet 1044C, the nozzle 1042C may be used to generate hollow, L-shaped dunnage 105C by extrusion, e.g., by supplying raw materials 104C into the inlet of the nozzle 1042C. The dunnage 105C has the shape of a hollow letter L, corresponding to the edge of the item 100C, without any breaks along a length of any line or section of the dunnage 105C generated thereby.

Figure 11A:
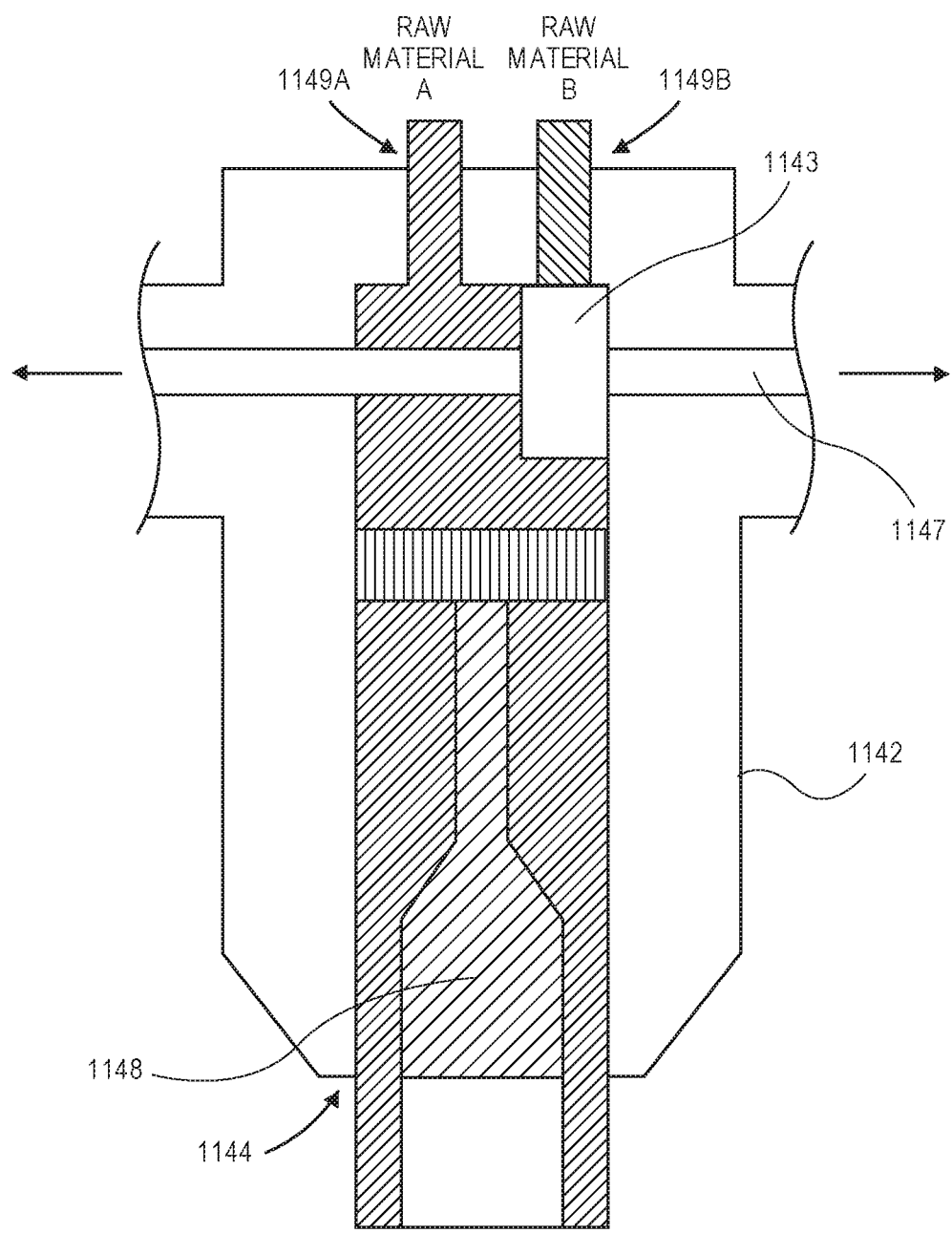
FIGS. 11A and 11B are views of aspects of systems for preparing customized dunnage in accordance with embodiments of the present disclosure.
Figure 11B:
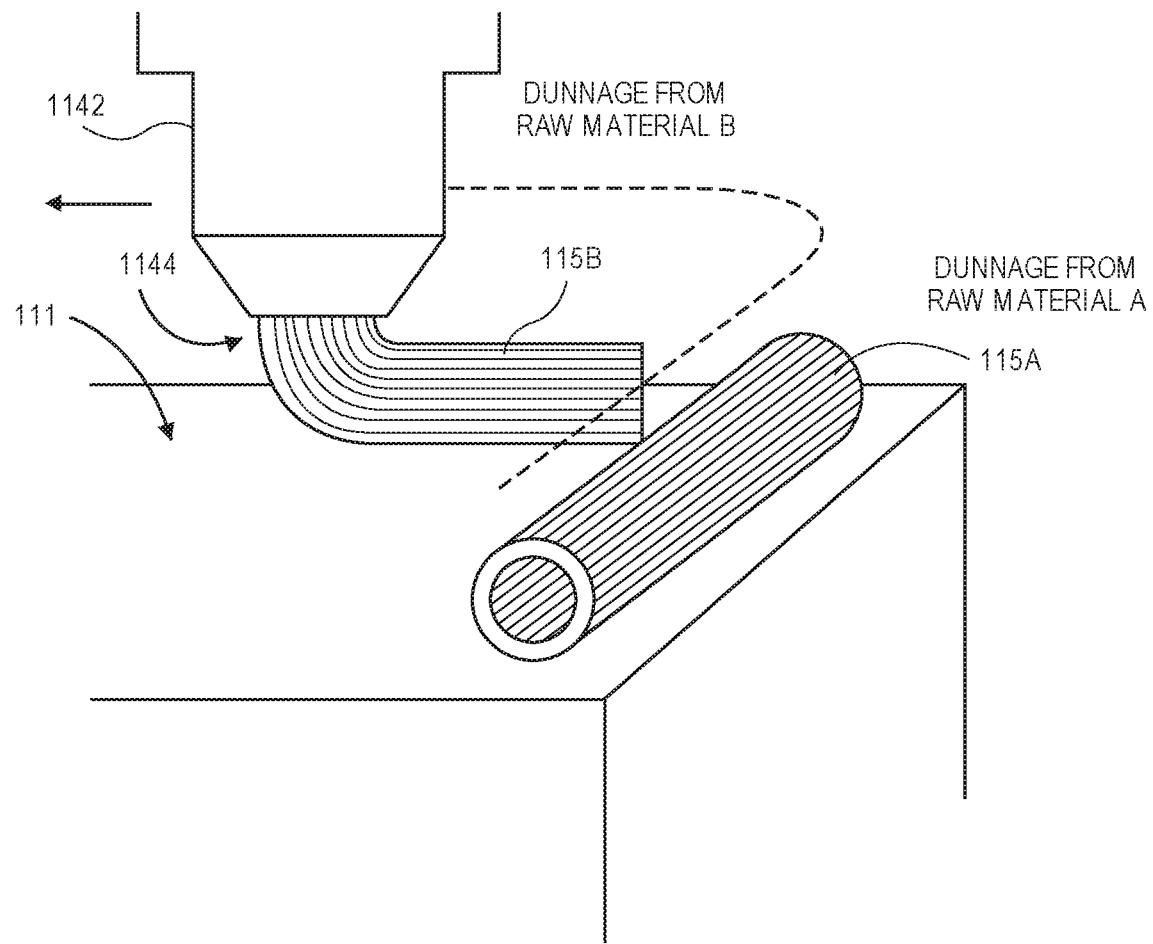

In some embodiments, a nozzle may be configured to apply dunnage formed from two or more different types of raw materials to surfaces of items. Referring to FIGS. 11A and 11B, views of aspects of systems for preparing customized dunnage in accordance with embodiments of the present disclosure are shown. Except where otherwise noted, reference numerals preceded by the number "11" in FIGS. 11A and 11B refer to elements that are similar to elements having reference numerals preceded by the number "10" in FIGS. 10A through 10C, by the number "9" in FIGS. 9A and 9B, by the number "8" in FIGS. 8A and 8B, by the number "7" in FIG. 7, by the number "6" in FIGS. 6A and 6B, by the number "5" in FIGS. 5A through 5D, by the number "4" in FIG. 4, by the number "2" in FIG. 2 or by the number "1" shown in FIGS. 1A through 1F.

As is shown in FIG. 11A, a nozzle 1142 has an outlet 1144 provided in a substantially frustoconical tip and is defined by a distal end of a plug (or centerbody) 1148. The nozzle 1142 further includes a piston 1143 coupled to a shaft 1147. The piston 1143 may be positioned laterally within the nozzle 1142 by the shaft 1147 to isolate one of a pair of inlets 1149A, 1149B of raw material to the nozzle 1142, and to permit flow through the nozzle 1142 from another of the pair of the inlets 1149A, 1149B.

As is shown in FIG. 11B, the nozzle 1142 may apply one or more lines or sections of dunnage, formed from different raw materials, upon surfaces of the item 111 as the nozzle 1142 moves in one or more straight or curvilinear lines. For example, as is shown in FIG. 11B, as the nozzle 1142 moves in a first straight line, the nozzle 1142 applies a first line or section of dunnage 115A from one of the raw materials via the inlet 1149A, e.g., with the piston 1143 in the position shown in FIG. 11A. After applying the first line or section of the dunnage 115A, the piston 1143 may be repositioned to isolate the inlet 1149A, and to permit flow through the nozzle 1142 from the inlet 1142B. Subsequently, the nozzle 1142 moves in a second straight line, and applies a second line or section of dunnage 115B from the other of the raw materials via the inlet 1149B.

Although the nozzle 1142 is shown as having only a pair of inlets 1149A, 1149B, those of ordinary skill in the pertinent arts will recognize that nozzles may receive raw materials from any number of sources, and may be configured to apply dunnage from combinations of one or more of such raw materials.

In some embodiments, dunnage may be applied to surfaces of items, such as items having non-standard geometries or shapes, in a manner that causes the item to have a desired geometry or shape with the dunnage thereon, e.g., a standard geometry or shape. Referring to FIGS. 12A through 12D, views of aspects of systems for preparing customized dunnage in accordance with embodiments of the present disclosure is shown. Except where otherwise noted, reference numerals preceded by the number "12" in FIGS. 12A through 12D refer to elements that are similar to elements having reference numerals preceded by the number "11" in FIGS. 11A and 11B, by the number "10" in FIGS. 10A through 10C, by the number "9" in FIGS. 9A and 9B, by the number "8" in FIGS. 8A and 8B, by the number "7" in FIG. 7, by the number "6" in FIGS. 6A and 6B, by the number "5" in FIGS. 5A through 5D, by the number "4" in FIG. 4, by the number "2" in FIG. 2 or by the number "1" shown in FIGS. 1A through 1F.

Figure 12A:
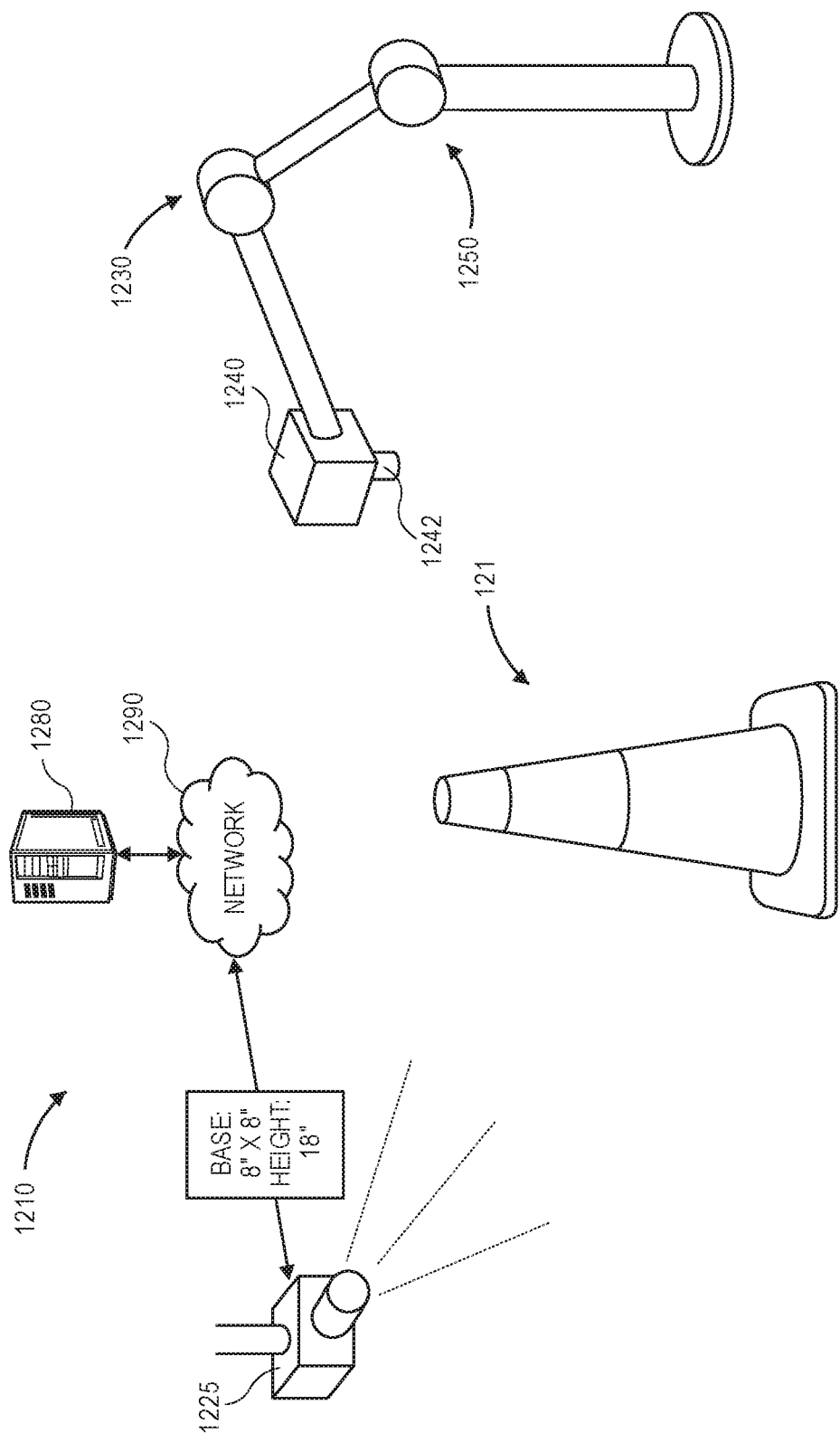
FIGS. 12A through 12D are views of aspects of systems for preparing customized dunnage in accordance with embodiments of the present disclosure.

As is shown in FIG. 12A, a system 1210 includes an imaging device 1225 (or another sensor), a dunnage applicator 1230 and a server 1280 connected to one another over a network 1290, which may include the Internet in whole or in part. The dunnage applicator 1230 includes an end effector 1240 coupled to a robotic arm 1250. The end effector 1240 includes a nozzle (e.g., a deposition nozzle) 1242 and may be programmed or configured to operate in response to computer-based instructions to apply dunnage on one or more surfaces of an item 121 having a non-standard or irregular geometry or shape (viz., a slender cone) The robotic arm 1250 may be configured to reposition the end effector 1240 along one or more principal axes, or to rotate about one or more of the principal axes, and to initiate or secure flow of the raw materials through the nozzle 1242, upon one or more surfaces of the item 121.

The imaging device 1225 captures imaging data regarding an item 121 (viz., a traffic cone) within a field of view, and determines one or more attributes of the item (e.g., dimensions of the item) based on the imaging data. For example, as is shown in FIG. 12A, the imaging device 1225 determines that the item 121 has a base with dimensions of approximately eight inches by eight inches (8"×8") and a height of approximately eighteen inches (18"), and reports the dimensions of the item 121 to the server 1280 over the network 1290.

Figure 12B:
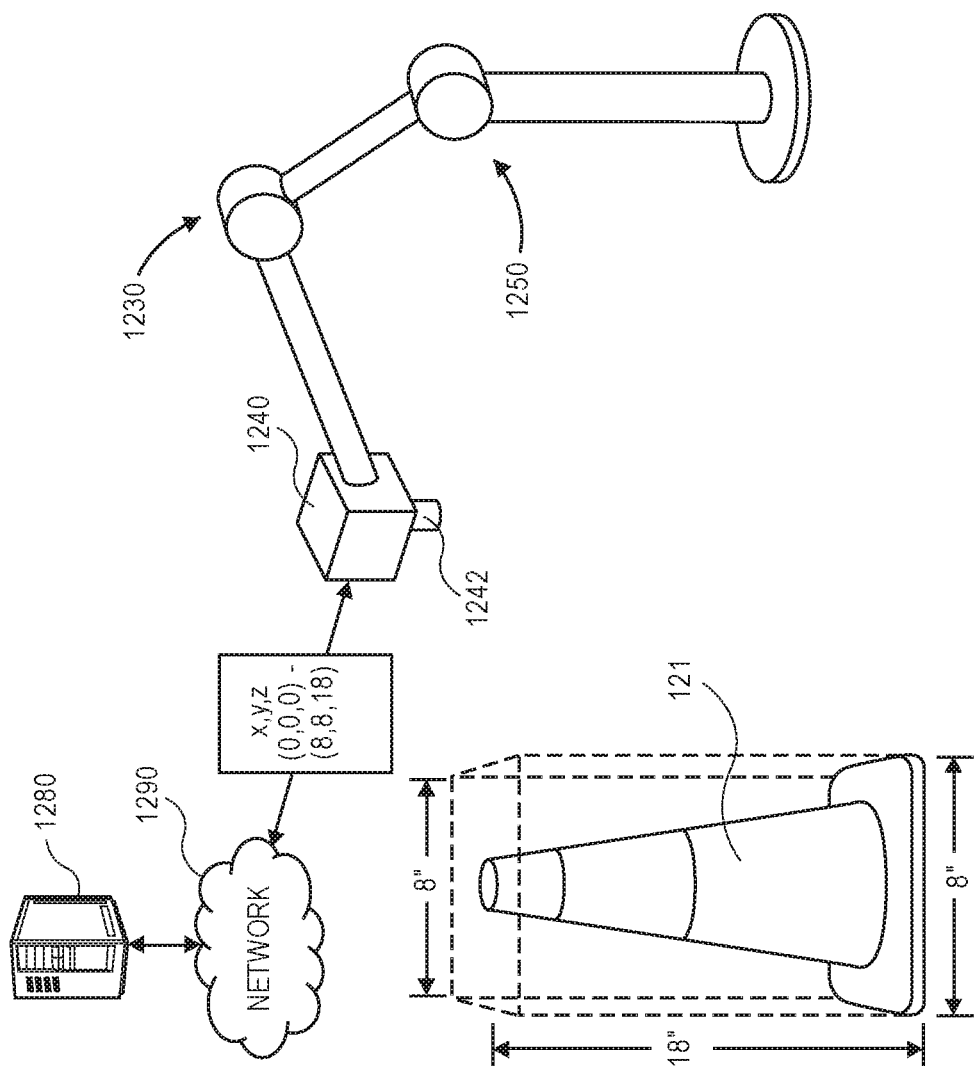
Figure 12B:
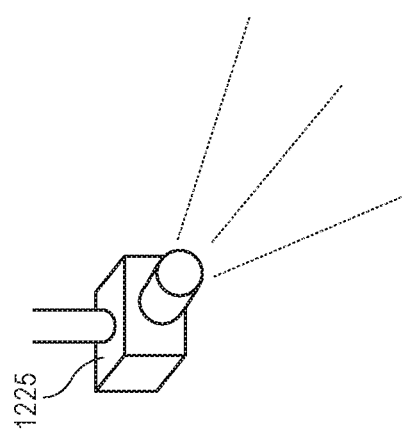
Figure 12C:
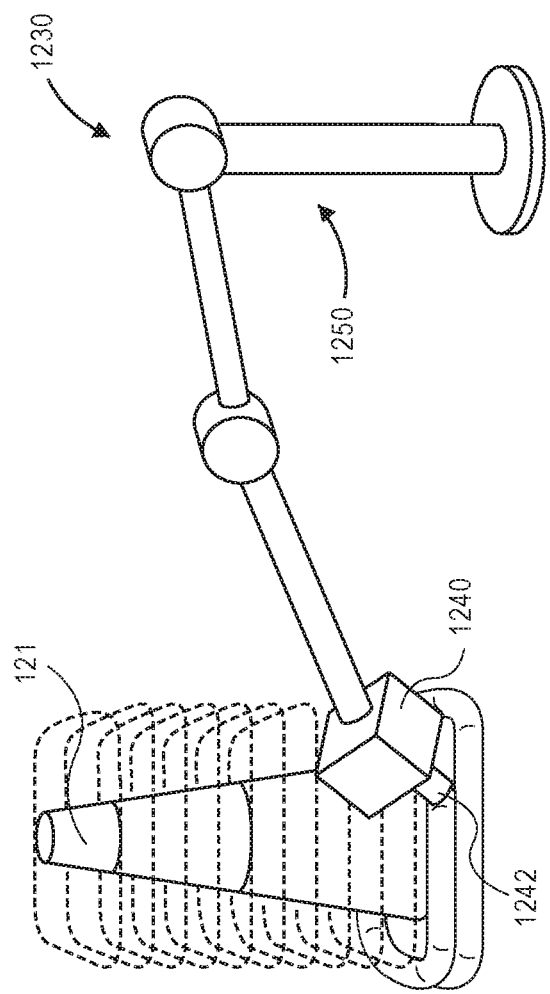
Figure 12C:
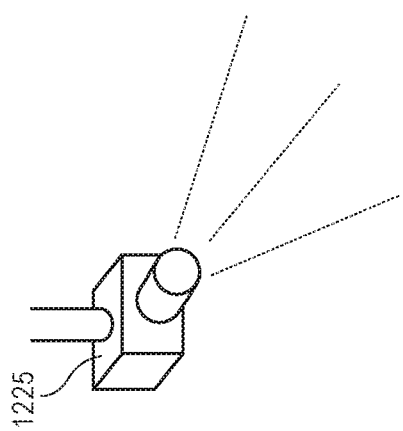

As is shown in FIG. 12B, based on the dimensions of the item 121, the server 1280 provides one or more instructions to the dunnage applicator 1230 for applying dunnage to the item and for forming an object having a shape of a rectangular solid with a base with dimensions of approximately eight inches by eight inches (8"×8") square and a height of approximately eighteen inches (18"). As is shown in FIG. 12C, the robotic arm 1250 is configured to manipulate the end effector 1240 to apply dunnage to the item 121 in a manner consistent with the instructions. For example, as is shown in FIG. 12C, the nozzle 1242 may apply dunnage in a spiraling fashion about a perimeter of the item 121, e.g., beginning at a base of the item 121. Alternatively, the imaging device 1225 and the dunnage applicator 1230 may operate in a serverless fashion, such that the imaging device 1225 provides the dimensions or other information or data regarding attributes of the item 121 to the dunnage applicator 1230 directly, and the dunnage applicator 1230 determines the one or more instructions for applying the dunnage 127 accordingly.

Figure 12D:
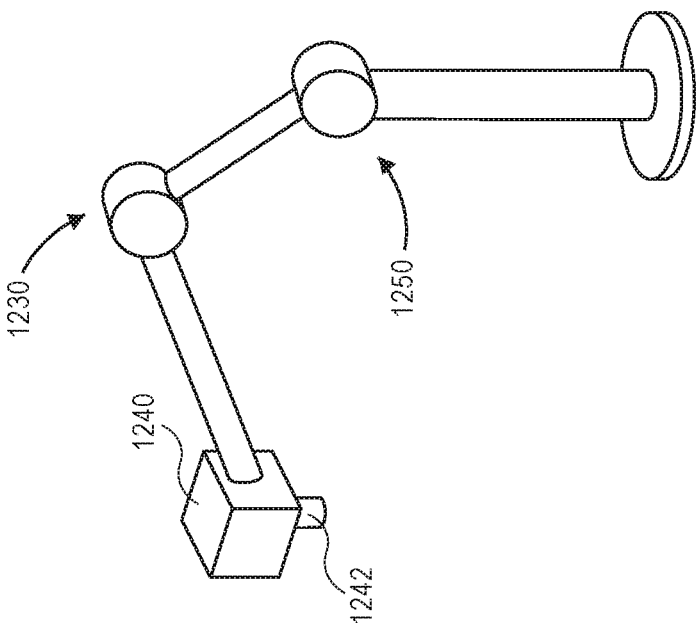
Figure 12D:
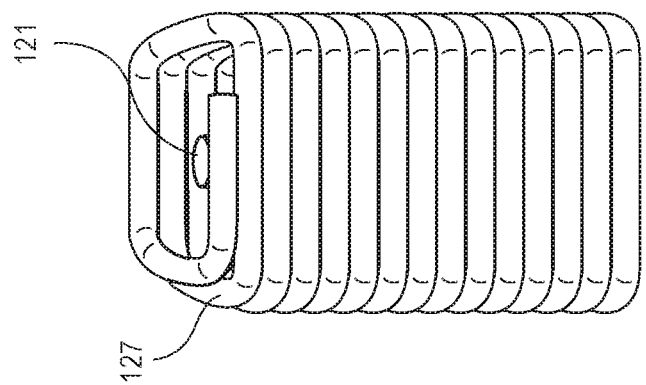
Figure 12D:
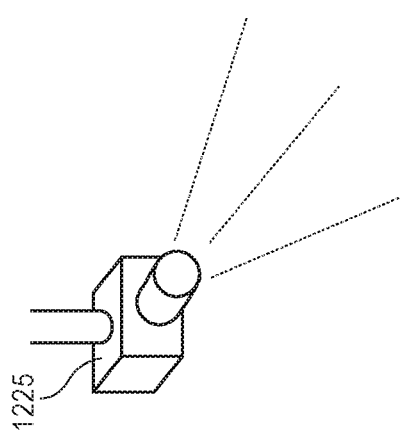

As is shown in FIG. 12D, after the dunnage 127 has been applied to the item 121, the item 121 and the dunnage 127 thereon have a standard or regular geometry or shape (e.g., a rectangular solid). The geometry or shape of the item 121 and the dunnage 127 thereon may correspond to a container (e.g., a box or carton) or a storage unit (e.g., a bin) into which the item 121 and the dunnage 127 thereon may be inserted. Thus, by applying one or more layers of the dunnage 127, an item having a non-standard or irregular geometry or shape may be configured for transportation or storage in containers or storage units having geometries or shapes of any size. Although the item 121 and the dunnage 127 of FIG. 12D are shown as a rectangular solid, those of ordinary skill in the pertinent arts will recognize that an item may be formed into any geometry or shape with the application of dunnage thereon. For example, where an item in the shape of a rectangular solid is to be transported or stored in a tube or other cylindrical container or vessel, dunnage may be applied by the nozzle 1242 to cause the item to have a shape that corresponds to the shape of the cylindrical container or vessel.

Although some embodiments of the present disclosure describe the application of dunnage to items within a fulfillment center environment, those of ordinary skill in the pertinent arts will realize that the systems and methods of the present disclosure may be utilized to apply dunnage to items for any purpose and are not limited for use in fulfillment centers. Rather, the systems and methods of the present disclosure may be utilized in connection with the application of dunnage to items for any reason, which may be customized based on any information or data regarding an item that may be known, determined or predicted.

Furthermore, the systems and methods of the present disclosure are not limited to the application of dunnage to single items. Rather, where information or data regarding a plurality of items (e.g., a bundle of such items) is known, predicted or determined, such information or data may be used to program a dunnage applicator system to apply dunnage to bundles of two or more items accordingly, based on attributes of the items individually or collectively.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A packaging system comprising:
   a conveying system;
   a digital camera aligned to include at least a first portion of the conveying system within a field of view;
   a dunnage applicator system comprising a deposition nozzle and a robotic arm, wherein the deposition nozzle is coupled to an end effector of the robotic arm, and wherein the robotic arm is configured to move or rotate the end effector with respect to at least one of three principal axes; and
   a computing device in communication with each of the digital camera and the dunnage applicator system,
   wherein the computing device is configured to at least:
      capture imaging data regarding an item on the conveying system by the digital camera;

determine at least one attribute of the item based at least in part on the imaging data;

select a pattern of dunnage to be applied to at least one portion of the item based at least in part on the at least one attribute of the item and a characteristic of dunnage based at least in part on a fit of the item with the pattern of dunnage deposited thereon within a wrapping or a container, wherein the at least one portion of the item is at least one of a surface or an edge of the item, and wherein the pattern comprises a plurality of linear sections of the dunnage selected based at least in part on the at least one attribute of the item and at least one curvilinear section of the dunnage selected based at least in part on the at least one attribute of the item;

generate instructions for causing the robotic arm to move or rotate the deposition nozzle to deposit dunnage on the at least one portion of the item according to the pattern and the characteristic;

cause the robotic arm to move or rotate the deposition nozzle according to the instructions; and deposit, with the robotic arm moving or rotating the deposition nozzle in accordance with the instructions, the dunnage on the at least one portion of the item according to the pattern and the characteristic.

2. The packaging system of claim 1, wherein the computing device is further configured to at least:

process the imaging data to recognize at least one of an outline of the item or a bar code provided on at least one external surface of the item within the imaging data; and determine the at least one attribute of the item based at least in part on the at least one of the outline of the item or the bar code provided on the external surface of the item.

3. The packaging system of claim 1, wherein the computing device is further configured to at least:

determine that the item is in a first position on the conveying system within a vicinity of the dunnage applicator system;

in response to determining that the item is in the first position on the conveying system, provide a raw material to an inlet of the deposition nozzle with the robotic arm moving or rotating the deposition nozzle in accordance with the instructions, wherein the dunnage is deposited on the at least one portion of the item according to the pattern;

determine that a temperature of the raw material is below a selected temperature; and in response to determining that the temperature of the raw material is below the selected temperature, cause the item to move to a second position on the conveying system.

4. The packaging system of claim 3, further comprising a flow wrapping system within a vicinity of the second position, wherein the flow wrapping system is configured to apply at least one layer of wrapping over an item, wherein the flow wrapping system is in communication with the computing device, and wherein the computing device is further configured to at least:

determine that the item is in the second position; and cause the flow wrapping system to wrap the at least one layer of the wrapping over the item and the dunnage in the pattern.

5. The packaging system of claim 1, wherein an outlet of the deposition nozzle comprises a substantially circular opening, wherein the deposition nozzle comprises a tip having a centerbody connected to a perimeter of the substantially perpendicular opening, wherein the raw material is applied in at least one substantially tubular section having a break along a length of the at least one substantially tubular section, and wherein the break corresponds to the connection of the centerbody to the perimeter.

6. A method for packaging an item, wherein the method comprises:

determining, by a computer device, at least one attribute of the item;

selecting, by the computer device, a pattern of dunnage to be applied to at least one surface of the item based at least in part on the at least one attribute of the item and a characteristic of dunnage based at least in part on a fit of the item with the pattern of dunnage deposited thereon within a wrapping or a container, wherein the pattern comprises at least one linear section of the dunnage selected based at least in part on the at least one attribute of the item and at least one curvilinear section of the dunnage selected based at least in part on the at least one attribute of the item;

determining, by the computer device, at least one direction with respect to the at least one surface of the item consistent with the pattern;

programming, by the computer device, a robotic arm to move a deposition nozzle coupled to the robotic arm in the at least one direction with respect to the at least one surface of the item;

causing, by the computer device, the robotic arm to move the deposition nozzle in the at least one direction with respect to the at least one surface of the item;

providing, with the robotic arm moving the deposition nozzle in the at least one direction, a raw material to an inlet of the deposition nozzle; and depositing, with the robotic arm moving the deposition nozzle in the at least one direction, the raw material upon the at least one surface of the item in the pattern and according to the characteristic by an outlet of the deposition nozzle, wherein the raw material is deposited upon the at least one surface of the item in the pattern and in accordance with the characteristic by the outlet of the deposition nozzle in a liquid or semi-liquid state and in at least one substantially hollow section.

7. The method of claim 6, further comprising:

transporting the item by at least one materials handling system, wherein determining the at least one attribute of the item comprises:

capturing, by at least one sensor in communication with the computer device, information regarding the item, wherein the at least some of the information regarding the item is captured by the at least one sensor with the item being transported by the at least one materials handling system.

8. The method of claim 7, wherein the at least one sensor is a digital camera having at least a portion of the materials handling system within a field of view, and wherein capturing the information regarding the item comprises:

capturing imaging data regarding the item by at least one imaging device; and recognizing, by the computer device, at least a portion of the item depicted within the imaging data,
wherein the at least one attribute of the item is determined based at least in part on the imaging data.

9. The method of claim 7, wherein the materials handling system comprises at least one of:
a conveyor; or
a robotic arm.

10. The method of claim 6, wherein an axis of the outlet of the deposition nozzle is parallel to the at least one surface of the item when the raw material is deposited upon the at least one surface of the item in the pattern.

11. The method of claim 6, wherein the raw material comprises at least one of:
an acrylonitrile butadiene styrene;
an acrylonitrile styrene acrylate;
a polyimide;
a polylactic acid;
a polyethylene terephthalate;
a glycol-modified polyethylene terephthalate;
a polypropylene; or
a thermoplastic polyurethane.

12. The method of claim 6, further comprising:
selecting, by the computer device, at least one of an inner diameter of the at least one substantially hollow section or an outer diameter of the at least one substantially hollow section based at least in part on the at least one attribute of the item.

13. The method of claim 6, wherein the at least one attribute of the item is at least one dimension of the item,
wherein selecting the pattern of the dunnage to be applied to the at least one surface of the item based at least in part on the at least one attribute of the item comprises:
determining a desired volume of the item; and
selecting the pattern of the dunnage based at least in part on the at least one dimension of the item and the desired volume of the item.

14. The method of claim 6, wherein an outlet of the deposition nozzle comprises an opening and a centerbody positioned within the opening,
wherein the opening and the centerbody have a common shape,
wherein the at least one substantially hollow section has the common shape, and
wherein the common shape is one of:
a circle;
a rectangle;
a triangle; or
an L-shape.

15. The method of claim 14, wherein the common shape is the circle,
wherein the raw material is applied in at least one substantially tubular section having a break along a length of the at least one substantially tubular section, and
wherein the break corresponds to a connection of the centerbody to a perimeter of the opening.

16. The method of claim 6, wherein the at least one surface of the item comprises a first surface of the item and at least one of:
a second surface of the item; or
an edge between the first surface of the item and the second surface of the item.

17. The method of claim 6, further comprising:
determining that a temperature of the raw material is less than a selected temperature, and at least one of:
causing the item having the raw material deposited thereon to be wrapped in at least one layer of plastic; or
causing the item having the raw material deposited thereon to be placed in at least one container.

18. A method for applying dunnage to an item, wherein the method comprises:
capturing information regarding the item by at least one sensor;
selecting a pattern for applying the dunnage to at least one surface of the item based at least in part on the information and a characteristic of dunnage based at least in part on a fit of the item with the pattern of dunnage deposited thereon within a wrapping or a container, wherein the pattern comprises at least one linear section of the dunnage and at least one curvilinear section of the dunnage;
programming a robotic arm with instructions for moving a deposition nozzle along or about at least one principal axis consistent with the pattern and the characteristic;
causing the robotic arm to move the deposition nozzle along or about the at least one principal axis in accordance with the instructions;
applying, by the deposition nozzle, raw material having a temperature above a selected temperature for the raw material to the at least one surface of the item; and
permitting the temperature of the raw material to drop below the selected temperature for the raw material.

19. The method of claim 18, wherein the raw material comprises at least one of:
an acrylonitrile butadiene styrene;
an acrylonitrile styrene acrylate;
a polyimide;
a polylactic acid;
a polyethylene terephthalate;
a glycol-modified polyethylene terephthalate;
a polypropylene; or
a thermoplastic polyurethane.

20. The method of claim 18, wherein an outlet of the deposition nozzle comprises a substantially circular opening,
wherein the deposition nozzle comprises a tip having a centerbody connected to a perimeter of the substantially perpendicular opening,
wherein the raw material is applied in at least one substantially tubular section having a break along a length of the at least one substantially tubular section, and
wherein the break corresponds to the connection of the centerbody to the perimeter.

21. The method of claim 18, wherein an outlet of the deposition nozzle comprises a circular opening defined by a centerbody,
wherein the centerbody comprises an extension mounted to an inner surface of the deposition nozzle, and
wherein the raw material is applied in a tubular section.

* * * * *